United States Patent
Sakurai

(10) Patent No.: US 11,173,403 B2
(45) Date of Patent: Nov. 16, 2021

(54) STORAGE MEDIUM STORING GAME PROGRAM, GAME APPARATUS, GAME SYSTEM, AND GAME PROCESSING METHOD

(71) Applicant: NINTENDO CO., LTD., Kyoto (JP)

(72) Inventor: Masahiro Sakurai, Tokyo (JP)

(73) Assignee: NINTENDO CO., LTD, Kyoto (JP)

( * ) Notice: Subject to any disclaimer, the term of this patent is extended or adjusted under 35 U.S.C. 154(b) by 0 days.

(21) Appl. No.: 16/563,201

(22) Filed: Sep. 6, 2019

(65) Prior Publication Data
US 2020/0114267 A1 Apr. 16, 2020

(30) Foreign Application Priority Data

Oct. 16, 2018 (JP) .............................. JP2018-195167

(51) Int. Cl.
| | |
|---|---|
| *A63F 13/79* | (2014.01) |
| *A63F 13/358* | (2014.01) |
| *A63F 13/88* | (2014.01) |
| *A63F 13/5372* | (2014.01) |
| *A63F 13/352* | (2014.01) |
| *A63F 13/843* | (2014.01) |

(52) U.S. Cl.
CPC ............ *A63F 13/79* (2014.09); *A63F 13/352* (2014.09); *A63F 13/358* (2014.09); *A63F 13/5372* (2014.09); *A63F 13/843* (2014.09); *A63F 13/88* (2014.09)

(58) Field of Classification Search
CPC .......................... A63F 2300/575; A63F 13/79
See application file for complete search history.

(56) References Cited

U.S. PATENT DOCUMENTS

| | | | | |
|---|---|---|---|---|
| 9,626,475 | B1* | 4/2017 | Schultz | A63F 13/69 |
| 10,286,324 | B1* | 5/2019 | McLellan | A63F 13/85 |
| 10,463,968 | B1* | 11/2019 | Patenge | A63F 13/35 |
| 2004/0266505 | A1* | 12/2004 | Keam | A63F 13/79 463/1 |
| 2007/0129126 | A1* | 6/2007 | Van Luchene | A63F 13/792 463/1 |

(Continued)

OTHER PUBLICATIONS

English translation of IDS reference Pokemori (Year: 2018).*

(Continued)

*Primary Examiner* — Jay Trent Liddle
(74) *Attorney, Agent, or Firm* — Scully, Scott, Murphy & Presser, P.C.

(57) ABSTRACT

An example information processing device chooses a subset of game objects as candidate game objects from among available game objects; selects a candidate game object as a selected game object according to the user's instruction; updating, when an update condition is satisfied, possession data in the memory so that the selected game object is set as a possessed game object possessed by the user; on a condition that the remaining time has been expired, replacing the candidate game object on the selection screen with a game object newly chosen from among the available game objects; and on at least one of a first condition that the candidate game object has been selected as a selected game object and a second condition that the update condition is satisfied, replacing the selected game object with a game object newly chosen from among the available game objects.

24 Claims, 21 Drawing Sheets

(56) References Cited

U.S. PATENT DOCUMENTS

| | | | | |
|---|---|---|---|---|
| 2008/0220876 | A1* | 9/2008 | Mehta | A63F 13/85 463/42 |
| 2010/0287065 | A1* | 11/2010 | Alivandi | A63F 13/822 705/26.1 |
| 2014/0179438 | A1* | 6/2014 | Xu | A63F 13/795 463/40 |
| 2015/0336003 | A1* | 11/2015 | Tezuka | A63F 13/792 463/17 |
| 2016/0051896 | A1* | 2/2016 | Hakuta | A63F 13/35 463/42 |
| 2016/0214019 | A1* | 7/2016 | Santini | G07F 17/3281 |
| 2018/0211307 | A1* | 7/2018 | Schultz | A63F 13/77 |
| 2018/0264366 | A1* | 9/2018 | Kawahara | A63F 13/798 |
| 2019/0262716 | A1* | 8/2019 | Ernst | A63F 9/24 |

OTHER PUBLICATIONS

"Nintendo Switch Online", online, Nintendo Co., Ltd., searched on Sep. 13, 2018, internet <https://splatoon.nintendo.com/splatnet2/>, printed Aug. 22, 2019.

[Pokemori], What can be done at a pea-sized shop, Animal Crossing pocket camp, AppMedia [online], Apr. 12, 2018, [searched on Mar. 30, 2021], Internet <URL: https://appmedia.jp/pokemori/1243323>.

Devil rumble event "Rumble Collection" will be held!, Destiny child official blog [online], Mar. 26, 2018, [searched on Mar. 30, 2021], Internet <URL: http://blog.destiny-child.jp/archives/7772325.html>.

Notice of Reasons for Refusal dated Apr. 14, 2021 received in Japanese Patent Application No. JP 2018-195167 together with an English language translation.

* cited by examiner

STORAGE MEDIUM STORING GAME PROGRAM, GAME APPARATUS, GAME SYSTEM, AND GAME PROCESSING METHOD

CROSS REFERENCE TO RELATED APPLICATION

The disclosure of Japanese Patent Application No. 2018-195167, filed Oct. 16, 2018, is incorporated herein by reference.

FIELD

The technology disclosed herein relates to a storage medium storing an information processing program, information processing device, information processing system, and information processing method that allow a user to select a game object in a game.

BACKGROUND AND SUMMARY

A user is conventionally allowed to select a game object (e.g., an item, a character, etc.). For example, in the case where a plurality of candidates for an item purchasable in a game are shown to a user, selection candidates are replaced at regular intervals.

A user is conventionally only allowed to select a shown game object, and therefore, there is room for improvement of amusingness.

With this in mind, the present disclosure provides a storage medium storing an information processing program, information processing device, information processing system, and information processing method that can provide improved amusingness when a user is allowed to select a game object.

(1) A non-limiting exemplary non-transitory computer-readable storage medium having stored therein an information processing program executable by a processor of an information processing apparatus, is provided in which the information processing apparatus comprises a memory; and the information processing program causes the processor to execute: choosing a subset of game objects as candidate game objects from among available game objects; generating an image of a selection screen showing the candidate game objects, the image being generated for a display; managing a remaining time for each of the candidate game objects, the candidate game objects being selectable by a user during the remaining time; selecting a candidate game object from among the candidate game objects as a selected game object according to the user's instruction; determining whether or not an update condition is satisfied; updating, when the update condition is satisfied, possession data in the memory so that the selected game object is set as a possessed game object possessed by the user; on a condition that the remaining time of the candidate game object has been expired, replacing the candidate game object on the selection screen with a game object newly chosen from among the available game objects; and on at least one of a first condition that the candidate game object has been selected as the selected game object and a second condition that the update condition is satisfied, replacing the selected game object on the selection screen with a game object newly chosen from among the available game objects after the at least one of the first and second conditions is satisfied.

According to the feature of (1), if it is determined that a selected game object is to be given to a user, the game object is given to the user. Therefore, the amusingness of selecting a game object can be improved, compared to when the user acquires the selected game object by simply selecting the selected game object. In addition, according to the feature of (1), when the remaining time has expired, a candidate game object is newly selected, and when it is assumed that the user desires to select another game object (i.e., when a candidate game object has been selected as a selected game object or when a selected game object has been given to the user), a candidate game object is newly chosen. Therefore, the convenience of the selection can be improved.

(2) On at least one of the first and second conditions, the processor may replace the selected game object on the selection screen with the game object newly chosen from among the available game objects immediately after the at least one of the first and second condition is satisfied.

(3) On at least one of the first and second conditions, the processor may replace the selected game object on the selection screen with the game object newly chosen from among the available game objects after a waiting time is expired, the waiting time being set when the at least one of the first and second conditions is satisfied, and the waiting time being decreased in accordance with real time.

(4) The processor may choose the subset of the game objects from among the available game objects based on a randomized algorithm.

According to the feature of (4), the user is less likely to be bored with game object line-ups shown thereto.

(5) A rarity parameter may be set for each of the candidate game objects, and the processor may choose the subset of the game objects from among the available game objects based on the randomized algorithm and the rarity parameter.

(6) The remaining time may be based in part on the rarity parameter set for the candidate game object.

(7) The information processing program may cause the processor to further execute: performing an acquisition game played by the user after the candidate game object is selected, and based on a result of the acquisition game, the processor may determine whether or not the update condition is satisfied.

According to the feature of (7), a selected game object is given to the user, depending on the result of the game played by the user, and therefore the amusingness of the user's selection of a game object can be improved.

(8) The processor may execute at least a competitive game as the acquisition game, and the processor may determine that the update condition is satisfied on a condition that the user has won in the competitive game.

According to the feature of (8), a game in which the process of allowing the user to select a game object is combined with the competitive game and which therefore has high amusingness can be provided.

(9) The processor may execute the competitive game using a character indicated by the selected game object as an opponent-side character.

According to the feature of (9), a game object that the user desires to acquire is used as an opponent-side character, and therefore, the amusingness of the competitive game can be improved.

(10) The processor may execute the competitive game in which a character indicated by or associated with the selected game object is an opponent.

According to the feature of (10), an opponent in the competitive game is determined, depending on a game object selected by the user, and therefore, the user can easily know the opponent.

(11) The information processing program may cause the processor to further execute: generating an image in which an opponent in the competitive game is associated with a character indicated by the selected game object.

According to the feature of (11), even in the case where a character that is a selected game object is not directly used as an opponent character, a game object (i.e., a character that is selected game object) that can be acquired by the user can be shown to the user in an easy-to-understand manner.

(12) On a condition that the user has lost in the competitive game, the processor may replace the candidate game object on the selection screen with a game object newly chosen from among the available game objects after the user's loss in the competitive game.

According to the feature of (12), when the user has lost, a candidate game object is newly chosen instead of the selected game object. Therefore, the user can be significantly motivated to win the competitive game, and the tension of the user in the competitive game can be increased. As a result, the amusingness of the competitive game can be improved.

(13) On a condition that the user has won in the competitive game, the processor may execute an additional game as a part of the acquisition game in addition to the competitive game, and based on a result of the additional game, the processor may determine whether or not the update condition is satisfied.

According to the feature of (13), by using the two types of games, the amusingness of the game for giving a selected game object can be improved.

(14) On the condition that the user has won in the competitive game, and a result of the additional game dissatisfies the update condition, the processor may maintain the selected game object chosen as the candidate game object as long as the remaining time of the selected game object is unexpired.

According to the feature of (14), the user who has won the competitive game can take an advantage, compared to when the user has lost the competitive game (i.e., an advantage that a selected game object maintained as a candidate game object). As a result, the amusingness of the game in which a game object is given, depending on the results of the competitive game and the additional game, can be improved.

(15) On a condition that the update condition has not been satisfied for the selected game object based on the result of the acquisition game and the same game object is subsequently selected as a selected game object according to the user's instruction, the processor may change the acquisition game so as to facilitate satisfaction of the update condition.

According to the feature of (15), a condition for the acquisition game is changed such that the giving condition is more likely to be satisfied. Therefore, the user can be motivated to acquire again a game object that the user has failed to acquire. As a result, the user can be motivated to repeatedly use the game object selection according to the feature of (14).

(16) The processor may execute, as the acquisition game, a timing game in which it is determined whether or not the update condition is satisfied, based on timing of the user's input.

(17) The processor may determine whether or not the user wins the timing game based on whether or not the timing of the user's input is in a winning range, the winning range being repeated during the timing game, and on a condition that the timing game has been won, the processor may determine that the update condition is satisfied.

According to the feature of (16) or (17), a timing game whose rule is easy to understand is used, and therefore, the possibility that it is difficult for the user to understand a game operation for acquiring a game object can be reduced.

(18) On a condition that the update condition has not been satisfied for the selected game object based on a result of the timing game and the same game object is subsequently selected as a selected game object according to the user's instruction, the processor may increase the winning range.

According to the feature of (18), like the feature of (15), the user can be motivated to acquire again a game object that the user has failed to acquire.

(19) On a condition that the selected game object has been given to the user, the processor may newly set a game object of the game object group as the selectable game object, instead of the selected game object, after the waiting time has passed.

According to the feature of (19), during a period of time until the waiting time has expired, the user selects, from the selectable candidate game objects, one other than that which has been selected as a selected game object, the next selected game object. Therefore, according to the feature of (18), the user can be prompted to select the next selected game object from the game objects that have not been selected before.

(20) The processor may decrease the remaining time as time passes, irrespective of whether or not the selection screen is displayed on the display, and on a condition that the remaining time of the candidate game object has been expired while the selection screen is not displayed, the processor may generate a new image of a second selection screen showing a candidate game object newly chosen from among the available game objects, in response to the selection screen is displayed again, the new image being generated for a display.

According to the feature of (20), the remaining time is reduced as time passes, and therefore, a candidate game object may be changed during a period of time that the candidate game object is not recognizable to the user. Therefore, a larger number of game objects can be shown to the user. In addition, according to the feature of (19), a game object that is newly chosen in response to the expiration of the remaining time during the above period of time can be shown to the user in an easy-to-understand manner when a candidate game object becomes visible to the user.

(21) The processor may replace the candidate game object on the selection screen with a game object newly chosen from among the available game objects, in response to use of an item specified by the user or consumption of a game parameter by the user.

According to the feature of (21), a candidate game object desired by the user is more easily shown, and therefore, the convenience of the user can be improved.

(22) The image of the selection screen may include the remaining time of the selectable game object.

According to the feature of (22), a candidate game object and a remaining time set therefore can be shown to the user in an easy-to-understand manner.

Note that the present disclosure discloses a non-limiting exemplary information processing device and information processing system having the features of (1)-(22). The present disclosure also discloses a non-limiting exemplary information processing method executable in the information processing device (or the information processing system) having the features of (1)-(22).

According to the above storage medium storing an information processing program, information processing device, information processing system, and information processing method, the amusingness of the user's selection of a game object can be improved.

These and other objects, features, aspects and advantages of the present exemplary embodiment will become more apparent from the following detailed description of the present exemplary embodiment when taken in conjunction with the accompanying drawings.

DETAILED DESCRIPTION OF NON-LIMITING EXAMPLE EMBODIMENTS

[1. Configuration of Game System]

A game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
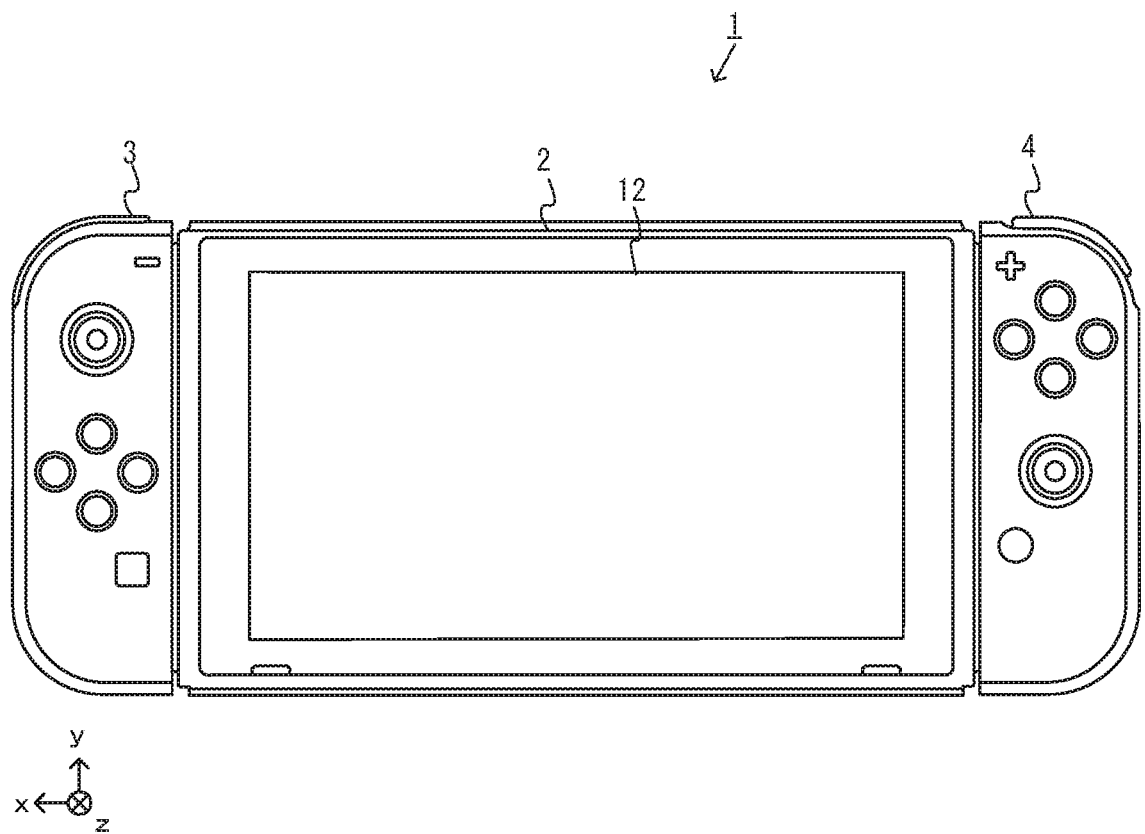
FIG. 1 is a diagram showing an example of a state where a non-limiting left controller and a non-limiting right controller are attached to a non-limiting main body apparatus.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
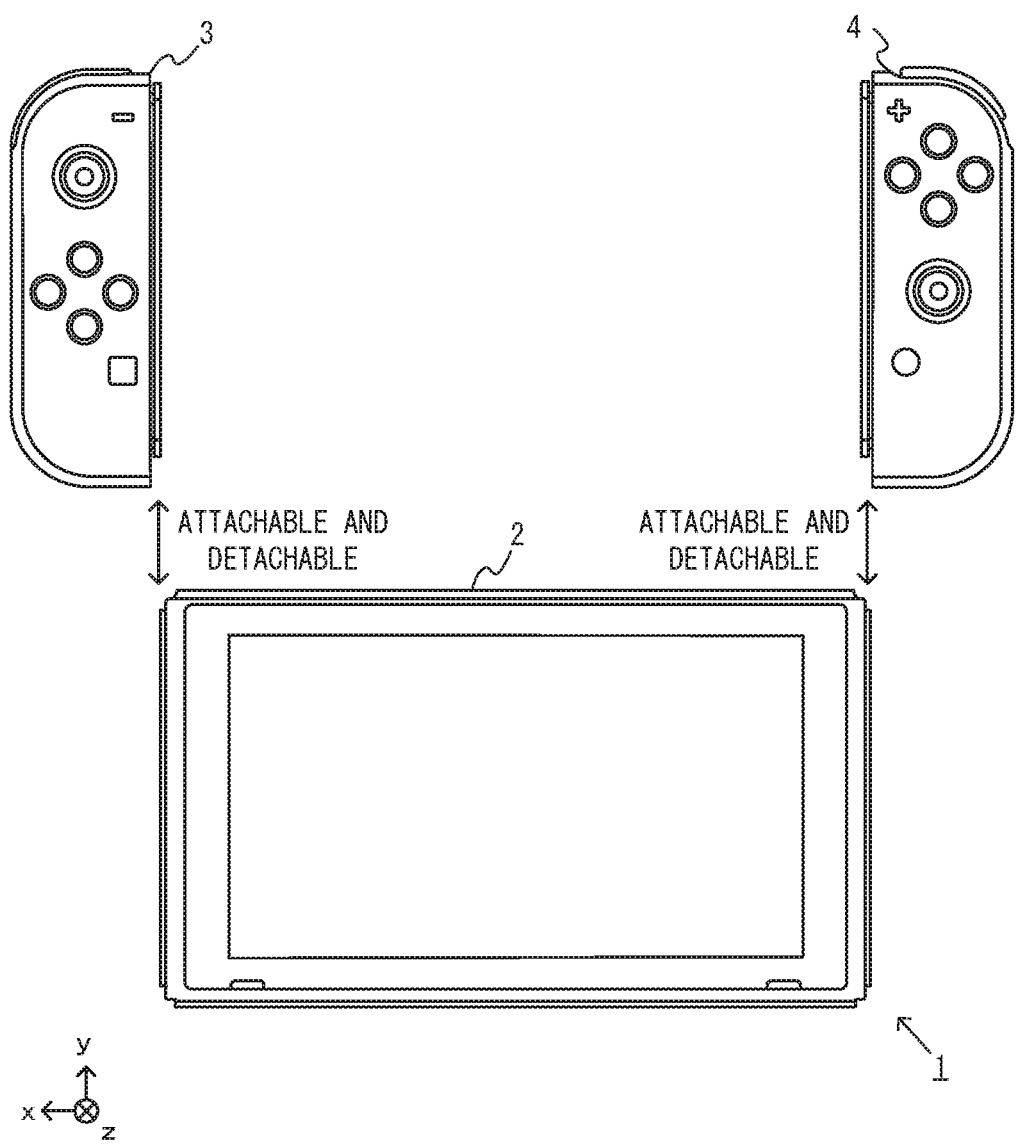
FIG. 2 is a diagram showing an example of a state where each of a non-limiting left controller and a non-limiting right controller is detached from a non-limiting main body apparatus.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
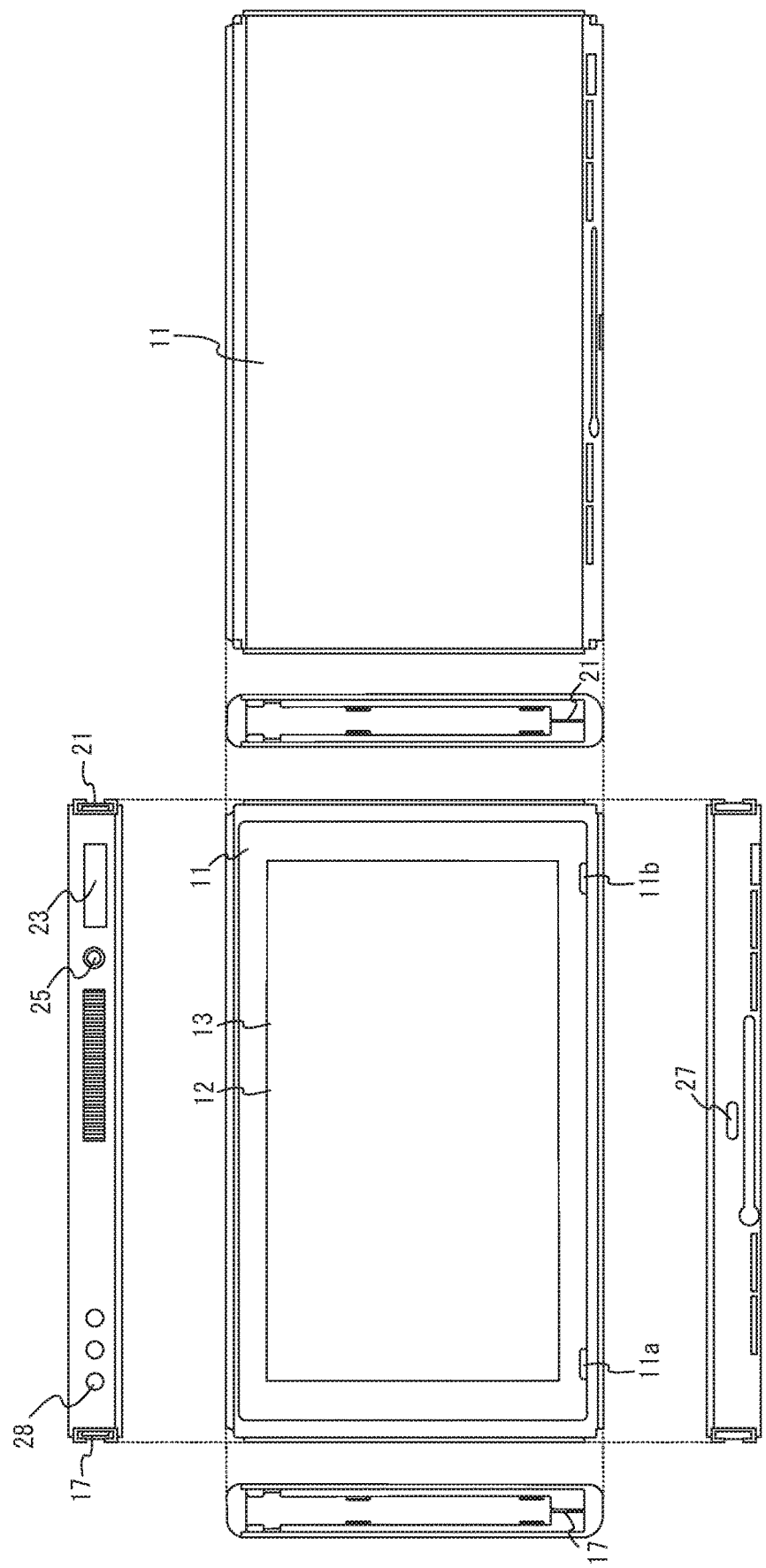
FIG. 3 is six orthogonal views showing an example of a non-limiting main body apparatus.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
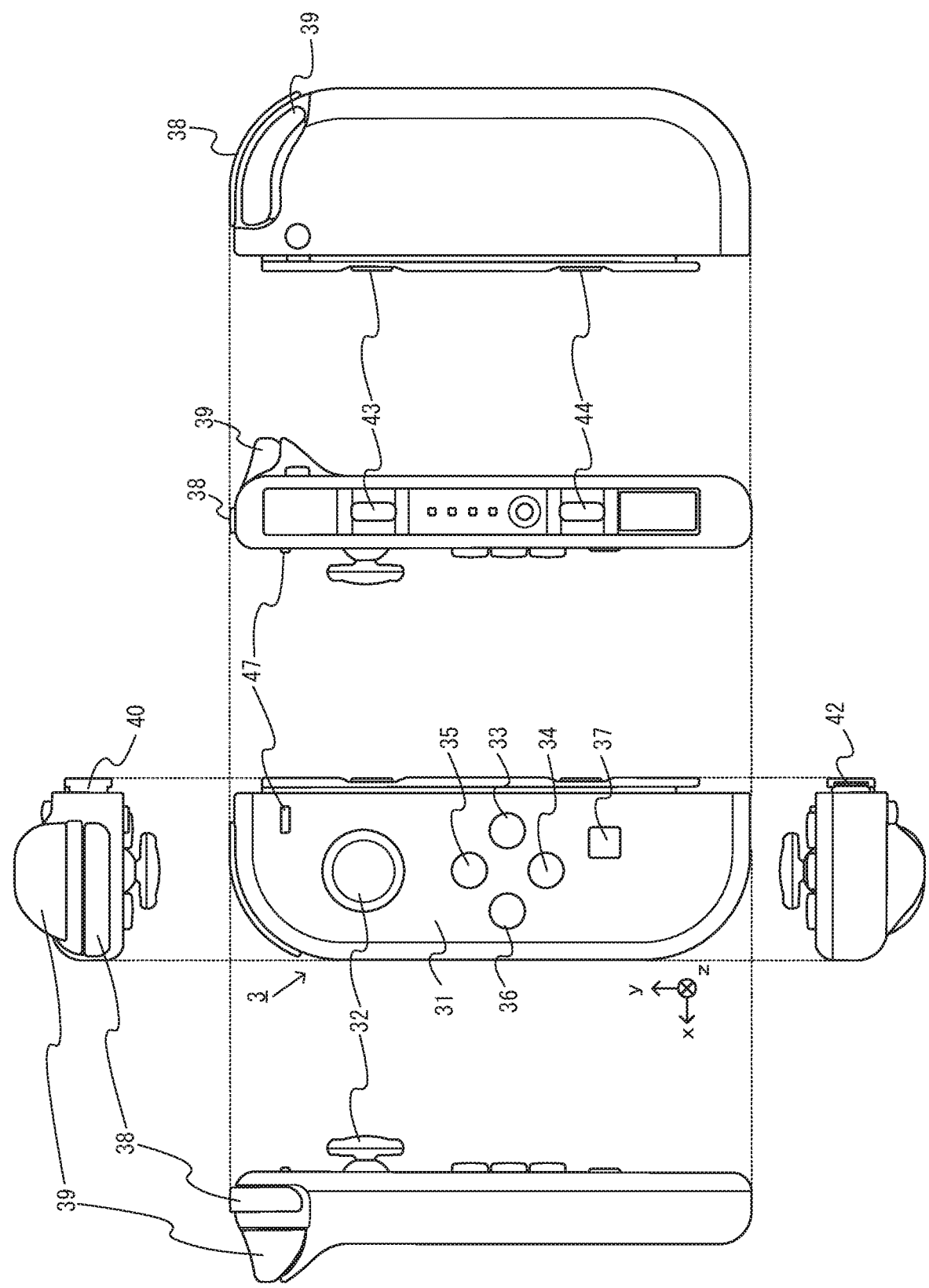
FIG. 4 is six orthogonal views showing an example of a non-limiting left controller.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
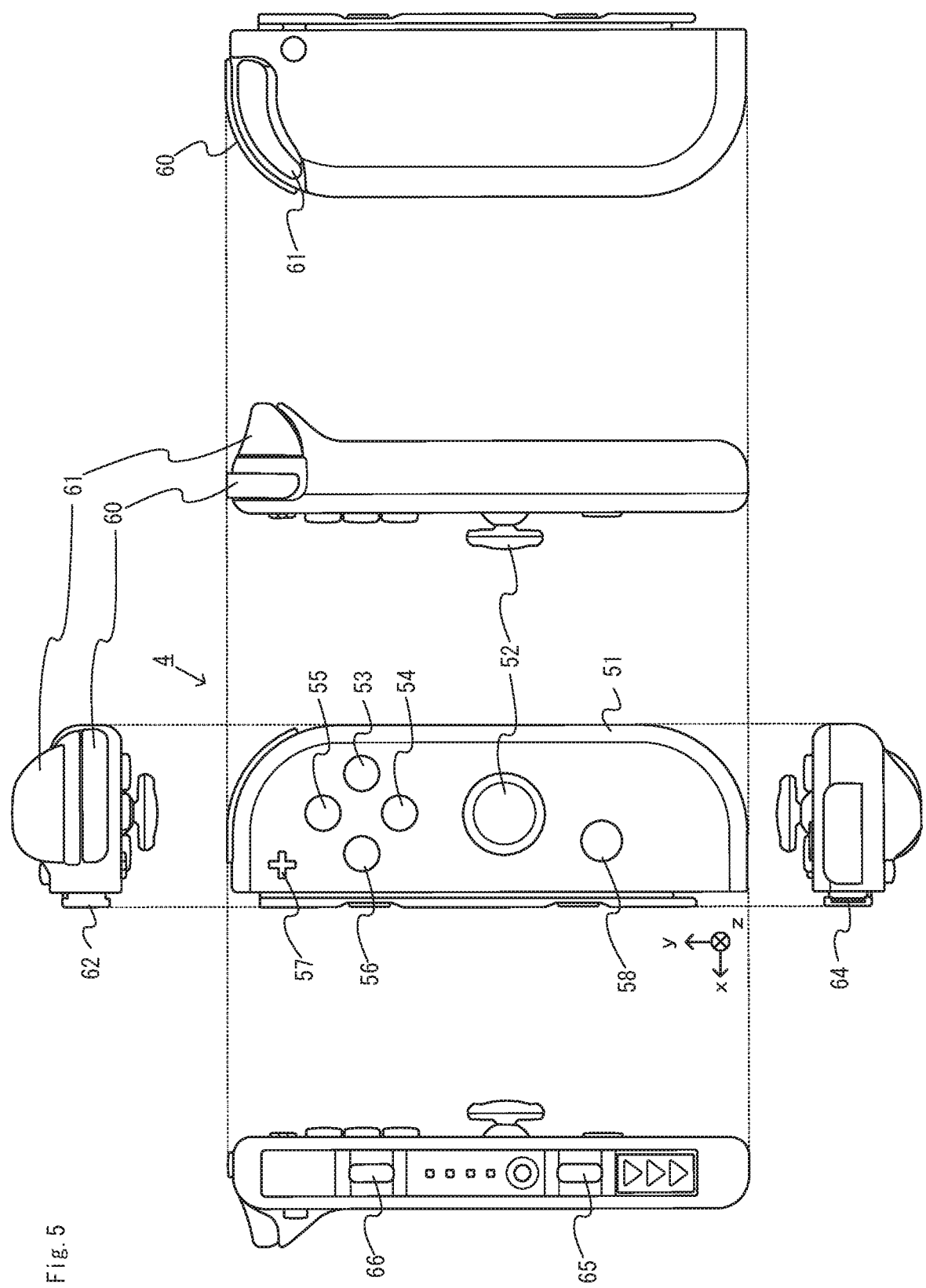
FIG. 5 is six orthogonal views showing an example of a non-limiting right controller.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
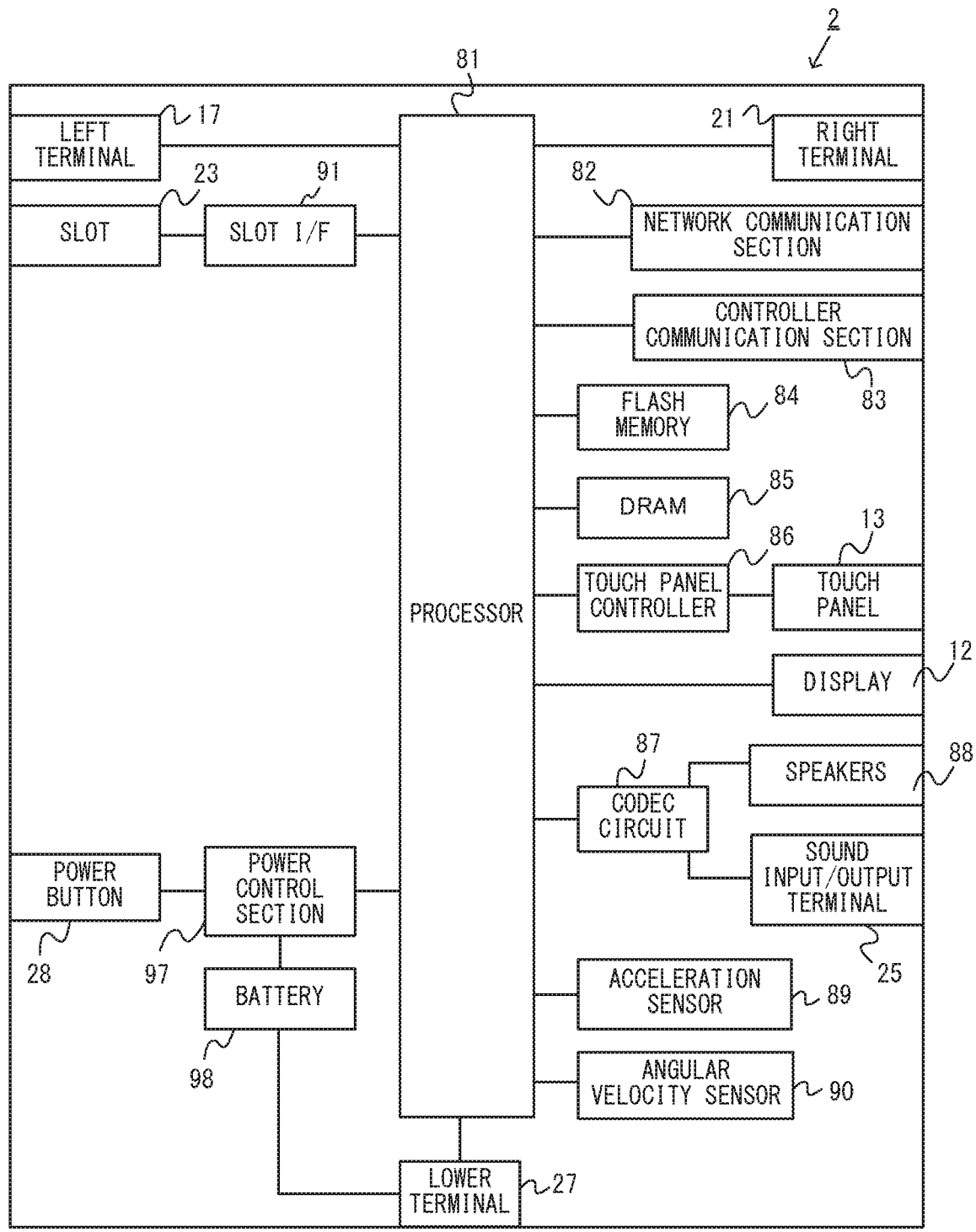
FIG. 6 is a block diagram showing an example of an internal configuration of a non-limiting main body apparatus.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. Based on a signal from the touch panel 13, the touch panel controller 86 generates, for example, data indicating the position where a touch input is provided. Then, the touch panel controller 86 outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

Further, the main body apparatus 2 includes an acceleration sensor 89. In the exemplary embodiment, the acceleration sensor 89 detects the magnitudes of accelerations along predetermined three axial (e.g., xyz axes shown in FIG. 1) directions. It should be noted that the acceleration sensor 89 may detect an acceleration along one axial direction or accelerations along two axial directions.

Further, the main body apparatus 2 includes an angular velocity sensor 90. In the exemplary embodiment, the angular velocity sensor 90 detects angular velocities about predetermined three axes (e.g., the xyz axes shown in FIG. 1). It should be noted that the angular velocity sensor 90 may detect an angular velocity about one axis or angular velocities about two axes.

The acceleration sensor 89 and the angular velocity sensor 90 are connected to the processor 81, and the detection results of the acceleration sensor 89 and the angular velocity sensor 90 are output to the processor 81. Based on the detection results of the acceleration sensor 89 and the angular velocity sensor 90, the processor 81 can calculate information regarding the motion and/or the orientation of the main body apparatus 2.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
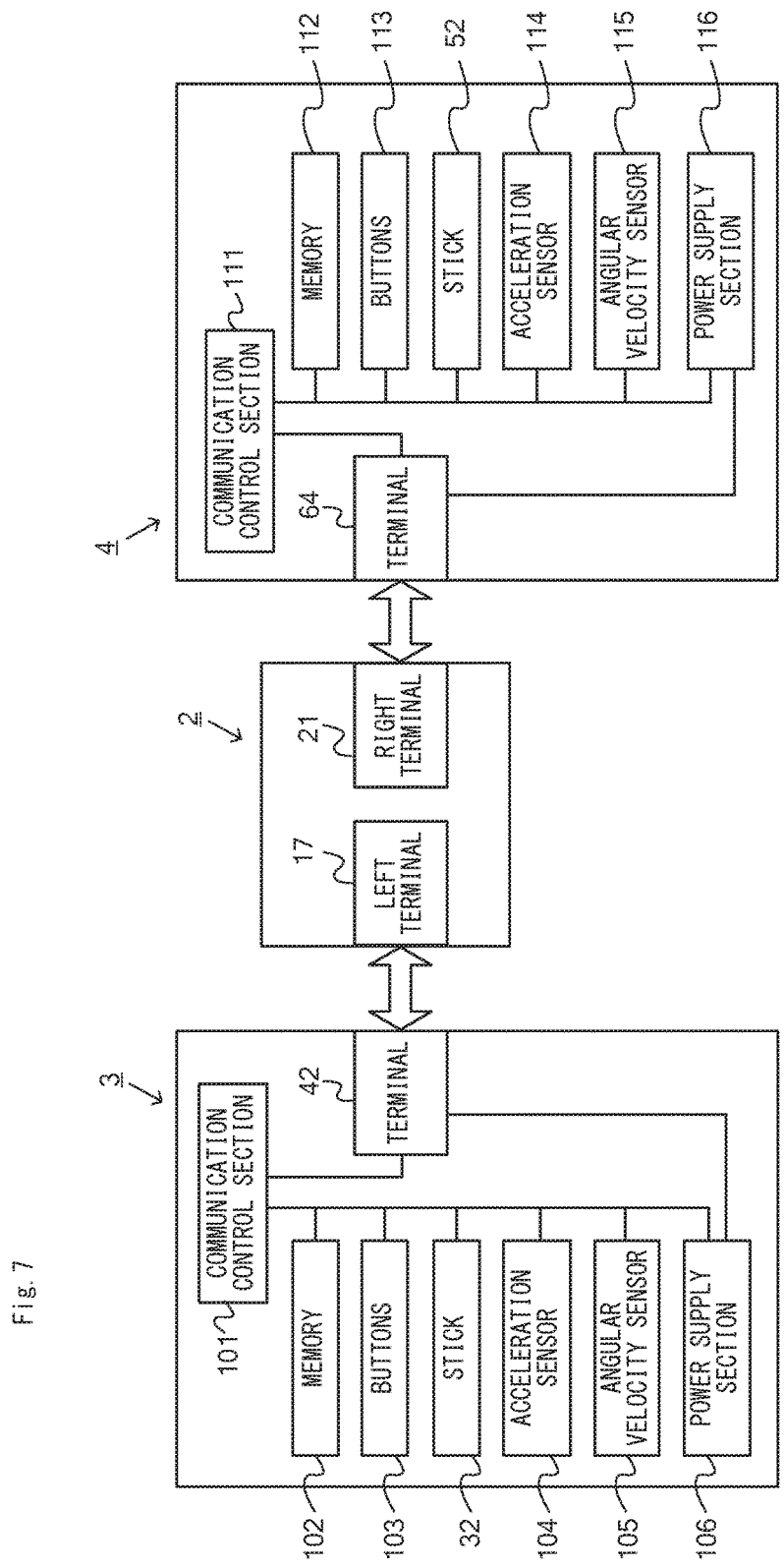
FIG. 7 is a block diagram showing examples of internal configurations of a non-limiting main body apparatus, a non-limiting left controller, and a non-limiting right controller.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a power supply section 106. In the exemplary embodiment, the power supply section 106 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3.

The right controller 4 includes a power supply section 116. The power supply section 116 has a function similar to that of the power supply section 106 of the left controller 3 and operates similarly to the power supply section 106.

[2. Overview of Processing in Game System]

An information process executed in the game system 1 will be outlined with reference to FIGS. 8-18. In the exemplary embodiment, in the game system 1, executed is a game in which a user (in other words, a player) operates a character to compete with another character. Here, in the exemplary embodiment, the game has a game mode (hereinafter referred to as an "acquisition game mode") in which the user is allowed to acquire a character that is a game object in the game. In the acquisition game mode, the user plays a competitive game in which a character selected by the user themselves is an opponent, and can acquire the character if a giving condition described below is satisfied. A process in the acquisition game mode will now be outlined.

Here, in the exemplary embodiment, characters used in the game include operational characters and sub-characters. Operational characters are controlled by the user in the competitive game. Sub-characters are added to operational characters. A sub-character added to an operational character changes the performance of that operational character (e.g., the performance of the operational character is enhanced or an attribute is given to the operational character). In other words, in the exemplary embodiment, the user adds a sub-character to an operational character to enhance that operational character in the competitive game. Thus, in the exemplary embodiment, the game system 1 provides a sub-character that can be added to an operational character, resulting in an improvement in the strategic aspect of the competitive game. Note that as described in detail below, in the exemplary embodiment, a sub-character is displayed as an icon image in a competitive game screen (see FIG. 13), and therefore, it is not necessary to prepare a 3D model disposed in a game space of the competitive game, or its motion, and therefore, it is easy to prepare a large number of sub-characters.

Note that in the exemplary embodiment, sub-characters include a first type of characters that are directly added to operational characters, and a second type of characters that are combined with the first type of characters. Note that in another exemplary embodiment, sub-characters may include only the first type of characters.

In the exemplary embodiment, in the acquisition game mode, the user is allowed to acquire a sub-character. Therefore, in the exemplary embodiment, the user can enhance an operational character in various aspects by collecting sub-characters in the acquisition game mode. As described above, the exemplary embodiment has the feature that it is easy to prepare a large number of sub-characters (i.e., it is not necessary to prepare 3D models of sub-characters), and therefore, for example, several hundreds of types of sub-characters may be prepared.

In another exemplary embodiment, game objects given to the user may include not only sub-characters but also operational characters. In addition, game objects given to the user may include any suitable game objects used in the game. For example, game objects given to the user may be items, music used in the game (e.g., a piece of music acquired by the user can be used as background music in the game), or game stages.

[2-1. Process in Acquisition Game Mode]

Figure 8:
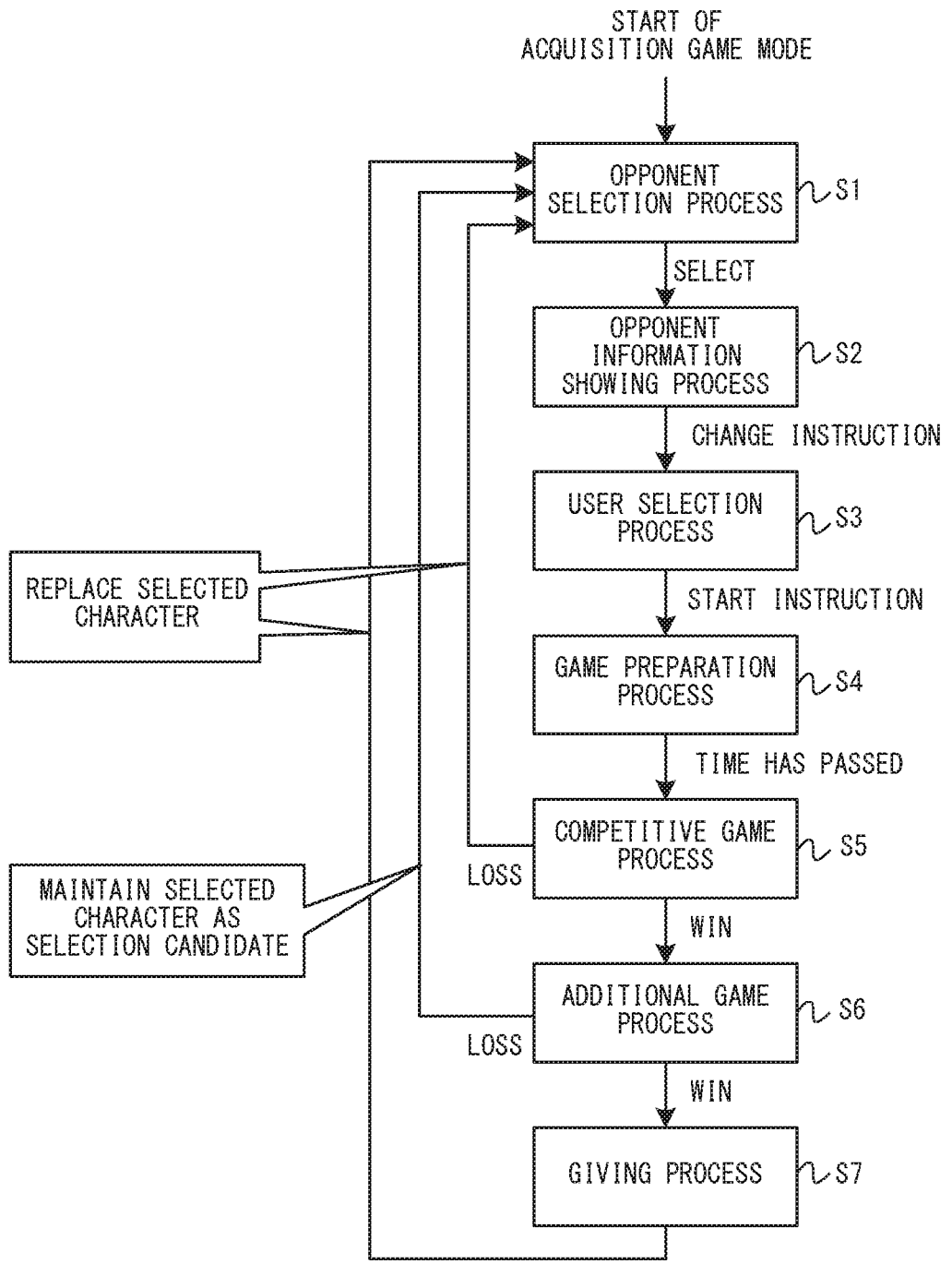
FIG. 8 is a diagram showing an example flow of a process in a non-limiting acquisition game mode.

A process in the acquisition game mode will now be described. FIG. 8 is a diagram showing an example flow of the process in the acquisition game mode. In the exemplary embodiment, in the acquisition game mode, the game proceeds according to the flow shown in FIG. 8.

(Opponent Selection Process)

As shown in FIG. 8, at the start of the acquisition game mode, the game system 1 initially executes an opponent selection process (step S1). In the opponent selection process, a sub-character that is a competitive opponent in the competitive game (in other words, a sub-character that the user desires to acquire) is selected according to the user's instruction. In the opponent selection process, the game system 1 displays, on a display device, an opponent selection screen for allowing the user to select a sub-character. Note that in the exemplary embodiment, the display device on which various game screen images are displayed may be the above display 12 or a stationary monitor.

Note that in the acquisition game mode of the exemplary embodiment, a competitive game is played in which the game object (i.e., a sub-character) that has been selected in step S1 and may be given to the user is an opponent. In another exemplary embodiment, a competitive game may be performed in which the game object supports the user. Specifically, in another exemplary embodiment, in the acquisition game mode, a competitive game may be performed in which the sub-character selected in step S1 is added to an operational character that is operated by the user, and the operational character competes with an opponent character.

Figure 9:
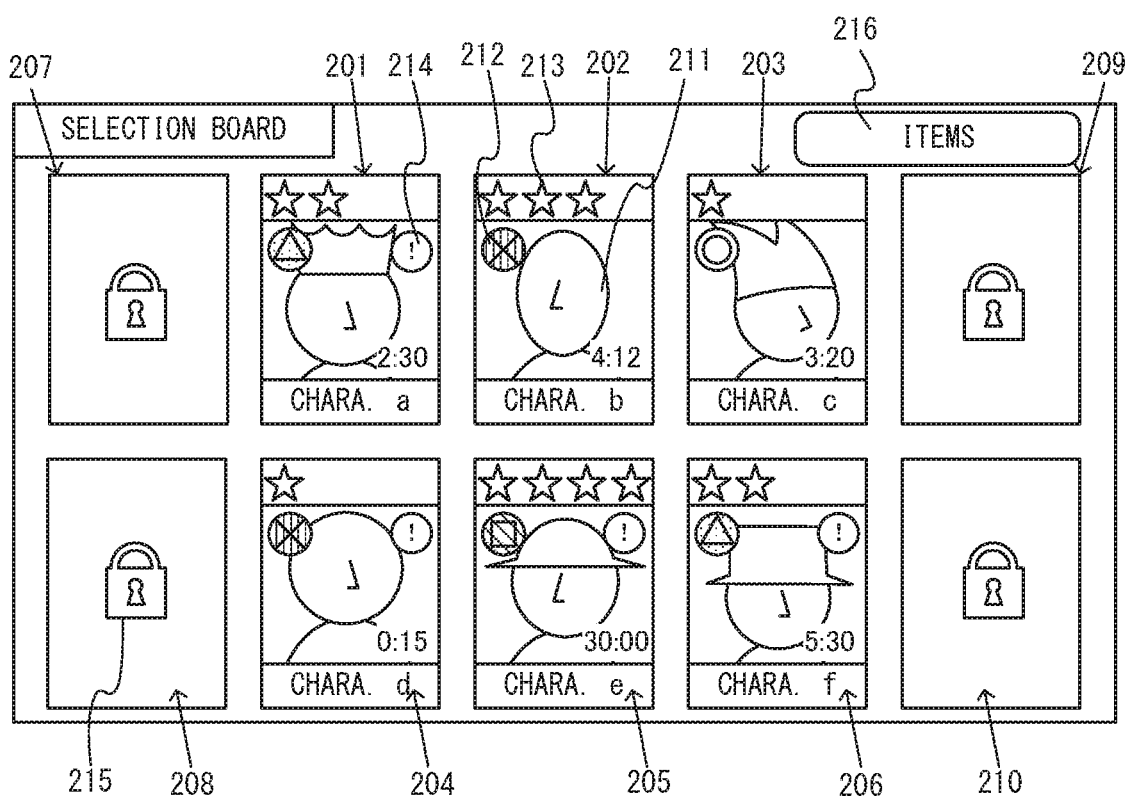
FIG. 9 is a diagram showing an example of a non-limiting opponent selection screen.

FIG. 9 is a diagram showing an example of the opponent selection screen. As shown in FIG. 9, the opponent selection screen is an image showing a plurality of candidates for a sub-character to be selected (i.e., selection candidates). Note that in the exemplary embodiment, a sub-character that can be selected by the user (i.e., a game object that can be selected by the user) is referred to as a "candidate game object." In the example of FIG. 9, the opponent selection screen contains a predetermined number of (here, 10) sub-character regions 201-210. The sub-character regions 201-210 are each for displaying information about a sub-character. Note that in FIG. 9, of the 10 sub-character regions 201-210, information about a sub-character is displayed in a predetermined number of (here, 6) sub-character regions 201-206 (such a number is referred to as a "basic showing number."

Note that in the exemplary embodiment, it is assumed that characters shown in the opponent selection screen include only sub-characters that can be selected by the user. Note that in another exemplary embodiment, the game system 1 may show not only sub-characters but also other characters in the opponent selection screen.

In the exemplary embodiment, the game system 1 prepares a larger number of sub-characters than the basic showing number. In the opponent selection screen, the basic showing number of sub-characters chosen from the prepared sub-characters are shown as candidate game objects. Note that a method for choosing candidate game objects is described below.

Note that in the exemplary embodiment, information about a sub-character is not displayed in the sub-character regions 207-210 of the sub-character regions 201-210. In the sub-character regions 207-210, an image (in FIG. 9, a mark representing a lock) 215 indicating that information about a sub-character is not displayed is displayed. Note that the remaining sub-character regions 207-210 in which the basic showing number of sub-characters are not displayed may be used to show a sub-character in addition to the basic showing number of sub-characters. For example, in the case where an event period is provided in the game, and a sub-character that can be selected only during the event period is prepared, such a sub-character may be shown in the remaining sub-character regions 207-210. Alternatively, for example, the game system 1 may show a sub-character in the remaining sub-character region 207-210 if the user satisfies a predetermined game condition (e.g., the user clears a particular game stage, or acquires a particular item). For example, if the predetermined game condition is satisfied, the lock mark 215 may be removed from the sub-character regions 207-210 (or some of the sub-character regions 207-210), and thereafter, a sub-character may be shown in the sub-character regions 207-210 in a manner similar to that for the sub-character regions 201-206. When a sub-character is shown in the remaining sub-character regions 207-210, the user can have more options.

Note that as shown in FIG. 9, in the exemplary embodiment, the opponent selection screen is as large as the entire screen of the display device, six sub-characters are shown as candidate game objects at once. Note that in another exemplary embodiment, not all candidate game objects need to be displayed in the opponent selection screen at once. For example, the opponent selection screen may be scrolled or may include turnable pages, and all candidate game objects may be shown by scrolling or turning pages.

In each of the sub-character regions 201-206, the following pieces of information about a sub-character are displayed:
an image showing the sub-character (e.g., an image 211);
a name (e.g., "Chara. a" in a sub-character region 201);
an image showing an attribute (e.g., an image 212);
an image showing a rarity (e.g., an image 213);
an image showing that the sub-character has not yet been acquired (e.g., an image 214); and
a remaining time (e.g., "2:30" in the sub-character region 201)

The above attribute information indicates an attribute set for a sub-character. Note that in the exemplary embodiment, when a sub-character of the first type is added to an operational character, the attribute of the sub-character is given to the operational character. In the exemplary embodiment, the attribute information indicates one of three attributes A-C having a trilemma competitive relationship and an attribute D that does not have a competitive relationship with the three attributes A-C. Note that the attribute A is superior to the attribute B, the attribute B is superior to the attribute C, and the attribute C is superior to the attribute A. In the exemplary embodiment, it is assumed that in the competitive game, an operational character having an attribute having a superior competitive relationship has an advantage over an operational character having an attribute having an inferior competitive relationship (e.g., the amount of damage is great compared to when there is not a competitive relationship in attribute).

The rarity information indicates a rarity set for a sub-character. In the exemplary embodiment, there are four rarity levels, which are each indicated by the number of star marks in a sub-character region (see FIG. 9). In the exemplary embodiment, the probability that a sub-character having a higher rarity is shown as a candidate game object in the opponent selection screen is set lower.

The information indicating that a sub-character has not yet been acquired is displayed in a sub-character region for a sub-character that is not possessed by the user (in the example of FIG. 9, the sub-character regions 201 and 204-206). Thus, in the exemplary embodiment, a sub-character that has already been acquired by the user can be chosen as a candidate game object. Note that in another exemplary embodiment, the game system 1 may not allow a sub-character that has already been acquired by the user, to be chosen as a candidate game object.

The remaining time information indicates a remaining time until the end of showing of a candidate game object (i.e., a sub-character) in the opponent selection screen. In other words, the remaining time indicates a period of time until the end of the state in which a sub-character is set as a candidate game object. In the exemplary embodiment, the remaining time is set for each sub-character that is a candidate game object. As described in detail below, when the remaining time set for a sub-character has expired (specifically, the remaining time is zero), the game system 1 ends the showing of that sub-character, and newly chooses one from the prepared sub-characters and shows the newly selected sub-character.

Note that the remaining time may be displayed in any suitable form. For example, in another exemplary embodiment, the remaining time may be indicated by an image of an indicator. Specifically, the indicator may be a bar indicator that has a variable length corresponding to the length of the remaining time (i.e., a bar becomes shorter as the remaining time decreases). Alternatively, the indicator may have a frame whose length represents the length of a period of time for which a sub-character is set as a candidate game object, and the inside of the frame may be gradually filled as time passes. In this case, the unfilled portion of the indicator represents the remaining time. In another exemplary embodiment, the remaining time may, for example, be represented by a message, such as "the sub-character will be replaced with another sub-character in 10 minutes (7 minutes has just passed)" (i.e., this message can be said to indicate that the remaining time is 3 minutes).

As shown in FIG. 9, the game system 1 generates an image containing information in which an image showing a sub-character currently set as a candidate game object (e.g., the image 211 of FIG. 9) is associated with an image showing the remaining time (e.g., "4:12" shown in FIG. 9) of that sub-character. This allows the remaining time set for a sub-character to be shown to the user in an easy-to-understand manner. Note that in the exemplary embodiment, the remaining time is represented in units of minutes and seconds (i.e., "4:12" of FIG. 9 represents 4 minutes and 12 seconds).

The game system 1 also generates, in the opponent selection screen, an image showing a sub-character currently set as a candidate game object (e.g., the image 211 of FIG. 9) and an image showing an attribute of that sub-character (e.g., the image 212 of FIG. 9). Therefore, the user can select a sub-character with which the user desires to compete (in other words, to acquire), taking the images into account. Note that in another exemplary embodiment, in sub-character regions, other information may be displayed in addition to the information about a sub-character. For example, information about an effect that a sub-character gives to an operational character may be displayed in sub-character regions.

In the opponent selection screen, the user selects a sub-character with which the user is to compete in the competitive game, by performing an input for activating one of the sub-character regions 201-206. Note that in the exemplary embodiment, an element (i.e., an image or a region) displayed on the screen of the display device may be activated in any suitable manner. For example, an element may be activated by performing an input on the touch panel 13 or by performing a button input on a controller with a cursor pointing the element displayed on the screen. In the exemplary embodiment, it is assumed that only one sub-character can be selected in the opponent selection screen. Alternatively, in another exemplary embodiment, two or more sub-characters may be selected in the opponent selection screen.

(Opponent Information Showing Process)

As shown in FIG. 8, if a sub-character has been selected in the opponent selection screen, the game system 1 executes an opponent information showing process (step S2). In the opponent information showing process, information about a candidate game object (i.e., a sub-character) selected in the opponent selection process is shown to the user. Note that a candidate game object selected according to the user's instruction is also hereinafter referred to as a "selected game object." In the exemplary embodiment, a selected game object is used as a sub-character for an opponent in the competitive game, and therefore, a sub-character as the selected game object is also referred to as an "opponent sub-character." In the opponent information showing process, the game system 1 displays, on the display device, an opponent information screen showing information about a selected game object (i.e., an opponent sub-character).

Figure 10:
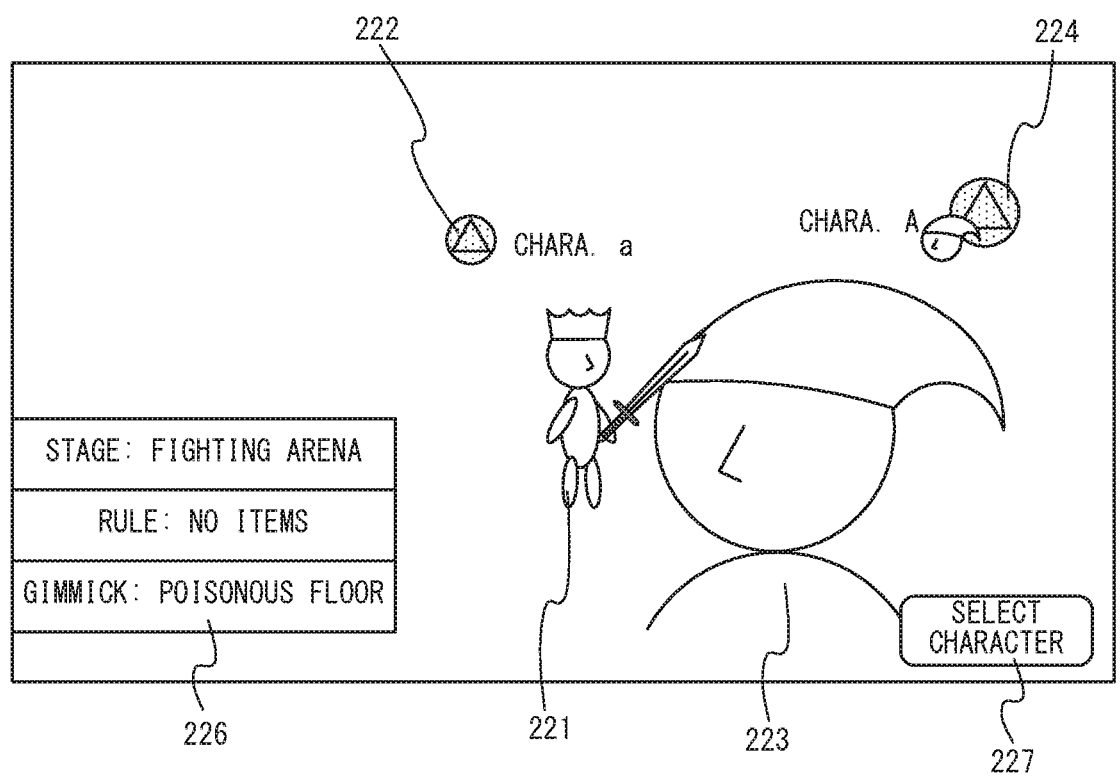
FIG. 10 is a diagram showing an example of a non-limiting opponent selection screen.

FIG. 10 is a diagram showing an example of the opponent information screen. As shown in FIG. 10, the opponent information screen contains, as information about an opponent sub-character which is a selected game object, a name ("Chara. a" in FIG. 10) and an image 221 showing the opponent sub-character. The opponent information screen further contains an opponent attribute icon 222 indicating an attribute of the opponent sub-character. As shown in FIG. 10, the opponent information screen also contains information about an operational character (hereinafter referred to an "opponent character") to which the opponent sub-character is added. Specifically, the opponent information screen contains a name ("Chara. A" in FIG. 10) of the opponent character and an image 223 showing the opponent character. The opponent information screen also contains an opponent icon 224 indicating the opponent character and an attribute thereof. Note that in the example of FIG. 10, the opponent information screen contains a game condition image 226 showing game conditions (e.g., a stage and rule of the competitive game, a gimmick placed in the stage, etc.) related to the competitive game.

In the exemplary embodiment, the image 223 showing the opponent character is displayed in association with the image 221 showing the opponent sub-character. Specifically, in FIG. 10, the image 221 showing the opponent sub-character is displayed, overlaying the image 223 showing the opponent character, i.e., being closer to the viewer than is the image 223 showing the opponent character.

Note that in the exemplary embodiment, an opponent character to which an opponent sub-character selected in the opponent selection screen is to be added is determined by the game system 1 according to a predetermined rule. The game system 1, when displaying the opponent information screen after an opponent sub-character has been selected as a selected game object in the opponent selection screen, determines an opponent character to which the opponent sub-character is to be added. For example, in the exemplary embodiment, an opponent character to which an opponent sub-character is to be added is previously determined for each sub-character. Note that an opponent character may be determined according to any suitable rule. An opponent character may be determined randomly or may be selected by the user.

The opponent information screen also contains a change instruction image 227 showing a change instruction to change the display of the display device from the opponent information screen to a user's character selection screen (described in detail below). Specifically, the user can give the change instruction by performing an input for activating the change instruction image 227. Note that in another exemplary embodiment, the game system 1 may allow the display of the display device to return from the opponent information screen to the selection screen. The game system 1 may also allow the display of the display device to be switched between the opponent information screen and the user's character selection screen. In this case, the game system 1 may also receive an instruction to start the game either in the opponent information screen or in the user's character selection screen.

(User Selection Process)

As shown in FIG. 8, if the change instruction has been given in the opponent information screen, the game system 1 executes a user selection process (step S3). In the user selection process, an operational character that is to be used by the user in the competitive game (hereinafter referred to as a "possessed character") and a sub-character that is to be added to the operational character (hereinafter referred to as a "possessed sub-character") are selected according to the user's instruction. In the user selection process, the game system 1 displays, on the display device, the user's character selection screen for allowing the user to select a possessed character and a possessed sub-character.

Figure 11:
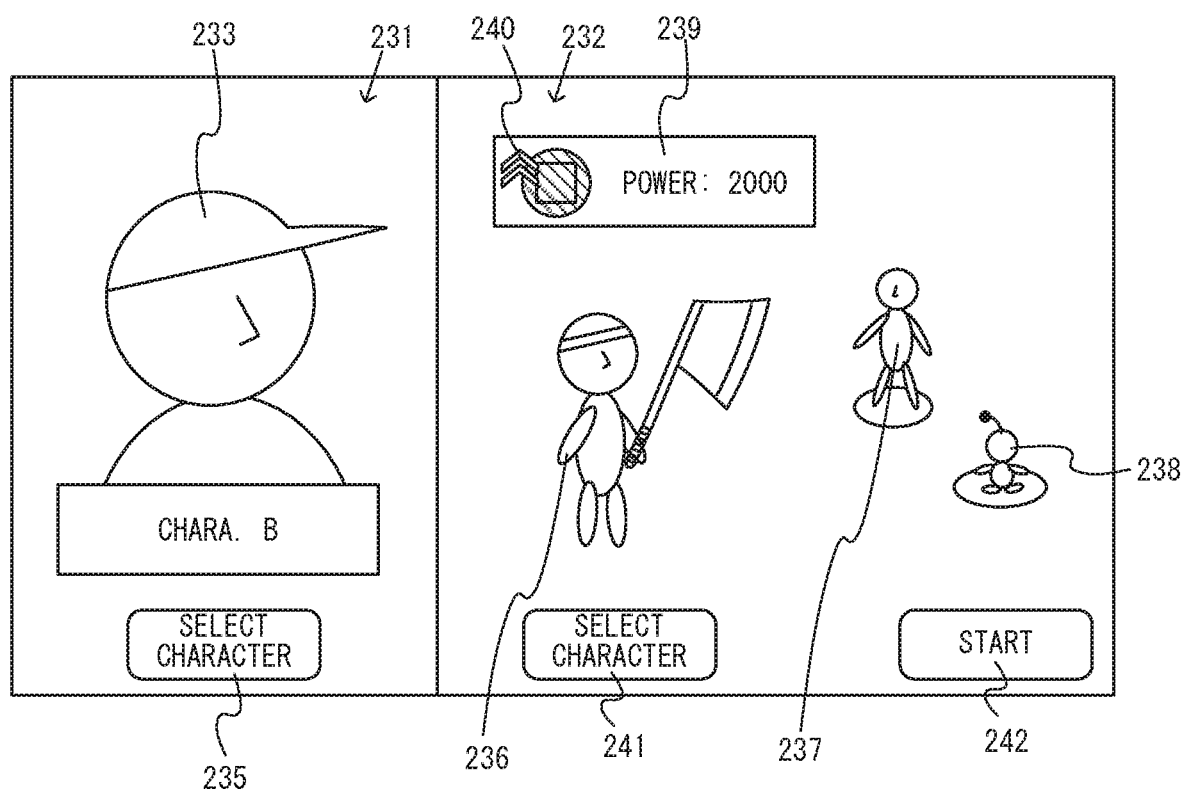
FIG. 11 is a diagram showing an example of a non-limiting user's character selection screen.

FIG. 11 is a diagram showing an example of the user's character selection screen. The user's character selection screen shows information about each character (i.e., a possessed character and a possessed sub-character) currently selected by the user. Specifically, as shown in FIG. 11, the user's character selection screen contains a possessed character region 231 and a possessed sub-character region 232. In the possessed character region 231, information about a possessed character currently selected is displayed. In the possessed sub-character region 232, information about a possessed sub-character currently selected is displayed. Note that the user's character selection screen of FIG. 11 indicates that each character (i.e., a possessed character and a possessed sub-character) are currently selected. Although not shown, if a character has not yet been selected when the user's character selection screen is displayed, a character is not displayed in the character region 231 or 232, or information indicating that a character has not been selected is contained in the character region 231 or 232.

As shown in FIG. 11, in the possessed character region 231, as information about the possessed character, a name ("Chara. B" in FIG. 11) and an image 233 showing the possessed character are displayed. In the possessed sub-character region 232, as information about the possessed sub-character, images 236-238 showing possessed sub-characters currently selected are displayed. Although, in FIG. 11, it is shown that three possessed sub-characters are currently selected, any suitable upper limit may be put on the number of possessed sub-characters that can be added to a possessed character.

The possessed sub-character region 232 also contains an additional effect region 239 (see FIG. 11). In the additional effect region 239, information about an effect that is given to the possessed character by the possessed sub-characters currently selected is displayed. Specifically, in the additional effect region 239, a possessed attribute icon 240 indicating an attribute (i.e., an attribute of the currently selected sub-characters) that is given to the possessed character. The possessed attribute icon 240 contains an image showing an attribute of the possessed sub-characters currently selected, and an image showing a competitive relationship between the attributes of the possessed sub-characters currently selected and the opponent sub-character (in FIG. 11, an image of an upward arrow indicating that the possessed sub-characters currently selected have an advantage over the opponent sub-character). In the additional effect region 239, information indicating a power value that is an index indicating a total strength of the effect that is given to the possessed character by the possessed sub-characters is also displayed.

As shown in FIG. 11, the possessed character region 231 contains a possessed character selection image 235. The possessed sub-character region 232 contains a possessed sub-character selection image 241. The selection images 235 and 241 are an instruction image showing an instruction to perform an operation of selecting a character. Specifically, when selecting a character, the user performs an input for activating the character selection image 235 or 241. In response to an input for activating the possessed character selection image 235, the game system 1 displays, on the display device, a selection screen (not shown) containing a plurality of operational characters that are a candidate for a possessed character to be selected. Meanwhile, in response to an input for activating the possessed sub-character selection image 241, the game system 1 displays, on the display device, a selection screen (not shown) containing a plurality of sub-characters that are a candidate for a possessed sub-character to be selected. In the selection screen, for example, a list of candidates for an operational character (or a sub-character) to be selected is displayed, and the user specifies and selects, as a possessed character (or a possessed sub-character), one operational character (or a sub-character) from the selection candidates contained in the selection screen. Information about the possessed character and possessed sub-character thus selected is displayed in the user's character selection screen.

The user's character selection screen also contains a start instruction image 242 showing a start instruction to start the competitive game (see FIG. 11). Specifically, the user can give a start instruction by performing an input for activating the start instruction image 242. The user can start the competitive game by giving the start instruction after selecting a possessed character and a possessed sub-character in the user's character selection screen.

(Game Preparation Process)

As shown in FIG. 8, if the start instruction has been given in the user's character selection screen, the game system 1 executes a game preparation process (step S4). In the game preparation process, a preparation required to start the competitive game (e.g., a process of loading data of a game program) is performed. In the game preparation process, the game system 1 displays, on the display device, a competition confirmation screen showing a user's character and an opponent character that are used in the competitive game.

Figure 12:
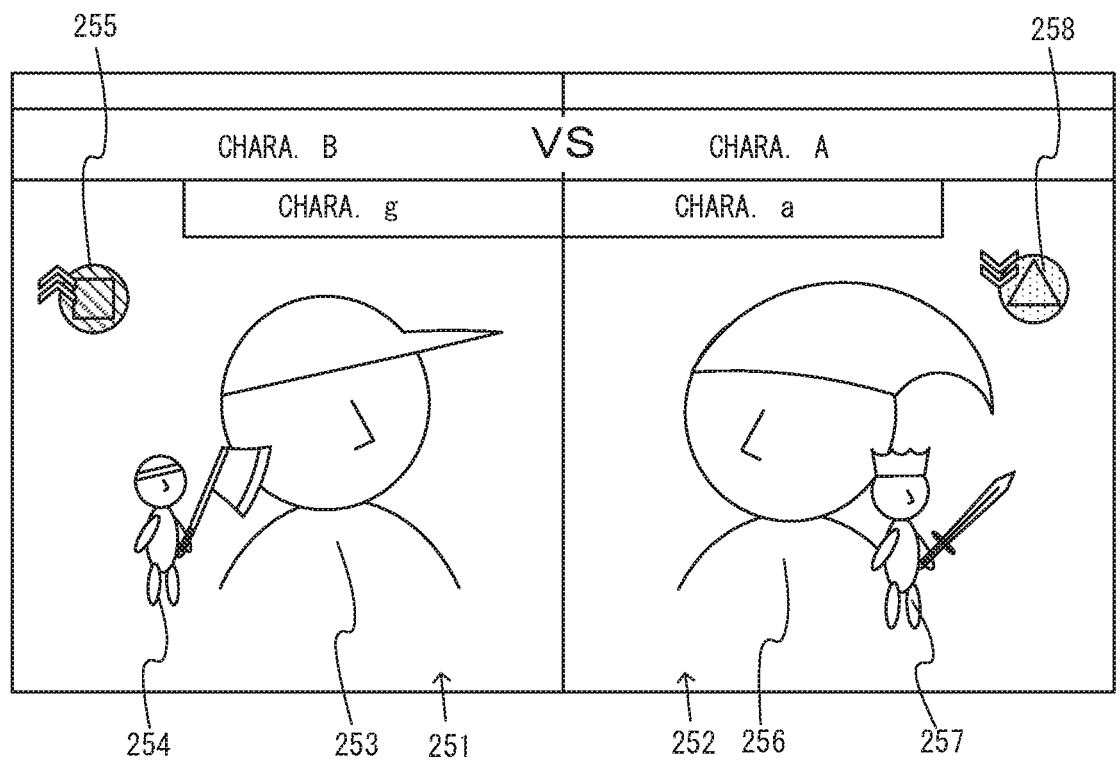
FIG. 12 is a diagram showing an example of a non-limiting competition confirmation screen.

FIG. 12 is a diagram showing an example of the competition confirmation screen. As shown in FIG. 12, the competition confirmation screen contains a user region 251 and an opponent region 252. In the user region 251, as information about a possessed character selected, a name ("Chara. B" in FIG. 12) of the possessed character and an image 253 showing the possessed character are displayed. In addition, in the user region 251, as information about a selected possessed sub-character, a name ("Chara. g" in FIG. 12) of the possessed sub-character and an image 254 showing the possessed sub-character are displayed. Note that in the exemplary embodiment, of possessed sub-characters, an image 254 showing a sub-character of the first type is displayed in the user region 251. In addition, in the user region 251, a possessed attribute icon 255 indicating an attribute of the selected possessed sub-character is displayed. The possessed attribute icon 255 contains an image showing the attribute and an image showing a competitive relationship as with the possessed attribute icon 240 (see FIG. 11).

In the opponent region 252, as information about an opponent character, a name ("Chara. A" in FIG. 12) of the opponent character and an image 256 showing the opponent character are displayed. In addition, in the opponent region 252, as information about an opponent sub-character selected as a selected game object, a name ("Chara. a" in FIG. 12) of the opponent sub-character and an image 257 showing the opponent sub-character are displayed. In addition, in the opponent region 252, an opponent attribute icon 258 indicating an attribute of the selected opponent sub-character is displayed. The opponent attribute icon 258 contains an image showing the attribute and an image showing a competitive relationship as with the possessed attribute icon 255.

In the competition confirmation screen, an image showing an operational character (i.e., a possessed character and an opponent character) is displayed in association with a sub-character (i.e., a possessed sub-character and an opponent sub-character) added to the operational character. Specifically, as shown in FIG. 12, an image showing an operational character is displayed in the same region (i.e., the user region 251 or the opponent region 252) in which a sub-character added to the operational character is displayed. An image showing a sub-character is displayed, overlaying the image showing the operational character, i.e. being closer to the viewer than is the image showing the operational character. This allows the user to confirm a combination of an operational character and a sub-character added thereto before the start of the competitive game.

(Competitive Game Process)

As shown in FIG. 8, after the end of the game preparation process, the game system 1 executes a competitive game process for executing the competitive game (step S5). In the competitive game process, a competitive game screen is displayed on the display device.

Figure 13:
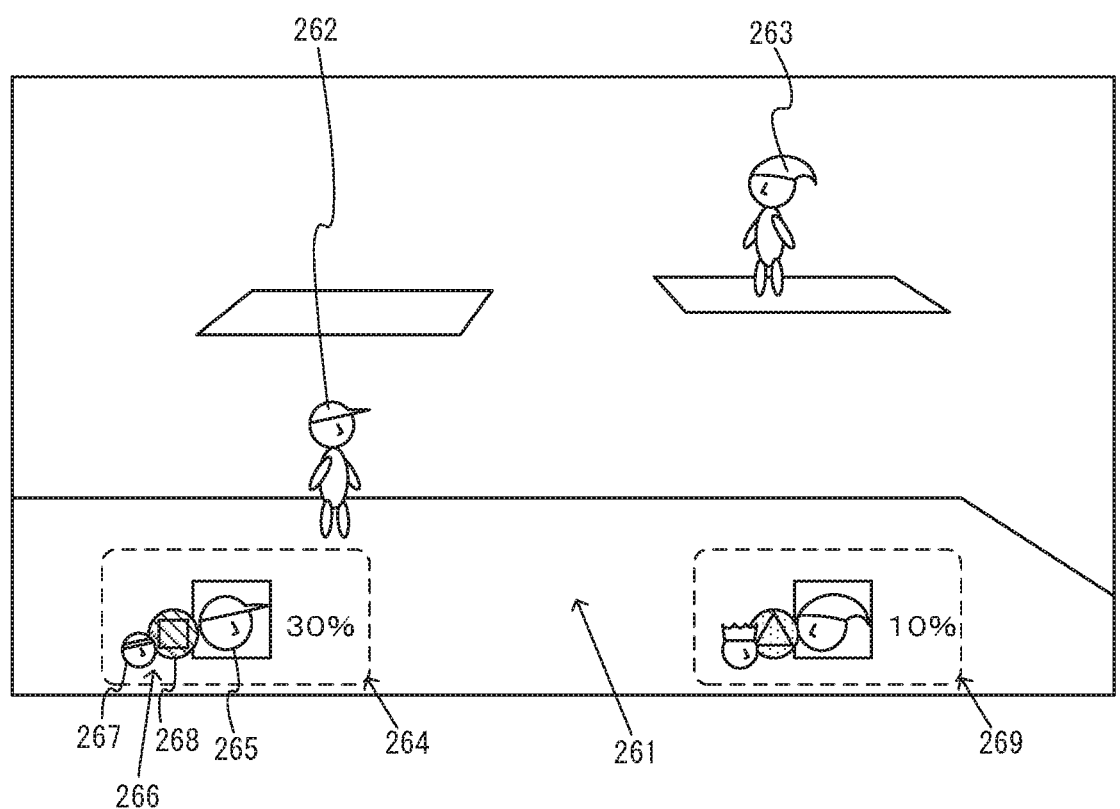
FIG. 13 is a diagram showing an example of a non-limiting competitive game screen.

FIG. 13 is a diagram showing an example of the competitive game screen. As shown in FIG. 13, the competitive game screen contains an image 261 showing a virtual space, an image 262 showing a possessed character disposed in the virtual space, and an image 263 showing an opponent character disposed in the virtual space. Thus, in the exemplary embodiment, it is assumed that the game system 1 does not dispose a sub-character in the virtual space. This allows the game system 1 to reduce the number of characters appearing in the competitive game, leading to a reduction in the processing load and data amount of the game. Note that in another exemplary embodiment, the game system 1 may dispose a sub-character in the virtual space.

In the exemplary embodiment, in the competitive game process, the game system 1 executes a competitive fighting game. Here, the competitive game process is executed based on (a)-(c):

performance of a possessed character to which an effect corresponding to a selected possessed sub-character is added;

performance of an opponent character to which an effect corresponding to a selected opponent sub-character is added; and a competitive relationship corresponding to an attribute of the possessed sub-character and an attribute of the opponent sub-character.

For example, in the competitive fighting game, when the possessed character attacks the opponent character, the game system 1 calculates the amount of damage on the opponent character caused by the possessed character's attack, based on the performances of the possessed character and the opponent character and the competitive relationship between the attributes of the possessed sub-character and the opponent sub-character.

As shown in FIG. 13, the competitive game screen contains character state display regions 264 and 269 for the respective characters. Although, in FIG. 13, dashed lines indicating boundaries of the character state display regions 264 and 269 are shown, the dashed lines may not actually be displayed. In each character state display region, information about an operational character and a sub-character is displayed.

In the character state display region 264 related to a possessed character, an icon 265 indicating the possessed character, and a possessed sub-character icon 266 indicating a possessed sub-character added to the possessed character are displayed (see FIG. 13). The possessed sub-character icon 266 contains an image 267 showing the possessed sub-character and an image 268 showing an attribute of the possessed sub-character.

In the character state display region 264, information about a current state of the possessed character is displayed (see FIG. 13). Specifically, the information indicates the amount of damage (in FIG. 13, "30%") on the possessed character is shown. Note that in another exemplary embodiment, as the information about a current state of the possessed character, for example, a value or indicator indicating a remaining physical strength of the possessed character may be displayed.

In the character state display region 269 related to an opponent character, information similar to that shown in the character state display region 264 related to the possessed character is displayed. Specifically, in the character state display region 269, an opponent character icon indicating the opponent character, an opponent sub-character icon indicating an opponent sub-character added to the opponent character, and information indicating a current state of the opponent character, are displayed. Thus, in the competitive game screen, an image showing the opponent character (i.e., an opponent character icon) and an image showing the opponent sub-character (i.e., an opponent sub-character icon) are displayed in association with each other.

As described above, in the exemplary embodiment, the game system 1 generates images (i.e., the opponent information image, the competition confirmation screen, and the competitive game screen) containing information in which a character (i.e., an opponent character) that is an opponent in the competitive game is associated with a character (i.e., an opponent sub-character) that is a selected game object. Here, in the exemplary embodiment, in order to reduce the number of characters appearing in the competitive game and thereby reduce the processing load and data amount of the game, a selected game object does not directly appear in the competitive game (i.e., a sub-character is added to an operational character), for example. Even in the case of such a feature, by generating an image containing information in which an opponent character is associated with a character that is a selected game object, the game system 1 can show, to the user, a relationship between a character that the user is trying to acquire and a character that is an opponent thereof, in an easy-to-understand manner.

Note that a specific method for displaying an image (e.g., an image of an opponent character) and another image (e.g., an image of an opponent sub-character) in association with each other may be any suitable method that allows the user to recognize a relationship between the two images. Specifically, in the exemplary embodiment, the game system 1 displays the two images in association with each other by causing the two images to overlap with each other. Alternatively, in another exemplary embodiment, the game system 1 may, for example, display the two images in association with each other by displaying a single frame surrounding the two images using a single frame or a line connecting the two images.

In the competitive game process, the game system 1 ends the competitive game if an end condition is satisfied. Note that the end condition may be any suitable condition. For example, the end condition may be that a predetermined period of time has passed from the start of the competitive game, or that either a possessed character or an opponent character has been knocked out (specifically, damage on any of the characters has reached a predetermined value or more).

At the end of the competitive game, the game system 1 determines whether or not the user has won (in other words, whether or not a possessed character has won). The win/loss determination may be performed in any suitable manner. For example, if an opponent character has been knocked out, or the amount of damage on a possessed character is smaller than the amount of damage on an opponent character when a predetermined period of time has just passed, the game system 1 determines that the user has won. Meanwhile, if a possessed character has been knocked out, or the amount of damage on a possessed character is greater than the amount of damage on an opponent character when a predetermined period of time has just passed, the game system 1 determines that the user has lost.

As shown in FIG. 8, if the user has lost the competitive game, the game system 1 executes the opponent selection process (step S1) again without executing an additional game process (step S6) described below. In this case, a giving process (step S7) of giving a sub-character that is a selected game object is also not executed, and therefore, a sub-character is not given to the user. In other words, in the above case, the user has failed to acquire a sub-character. Note that in the above case, the opponent selection process is executed again, and therefore, the user can continue to select a sub-character and play the competitive game.

(Additional Game Process)

Meanwhile, if the user has won the competitive game, the game system 1 executes an additional game process for performing an additional game (step S6). The additional game is played in order to determine whether or not a sub-character that is a selected game object is to be given to the user. Specifically, in the exemplary embodiment, if the user has won the additional game, the game system 1 determines that a giving condition is satisfied, and gives a selected game object to the user. Thus, in the exemplary embodiment, the game system 1 performs the competitive game and the additional game as an acquisition game for allowing the user to acquire a game object. In the exemplary embodiment, the additional game is a timing game in which the user wins if the user performs an input with appropriate timing.

Figure 14:
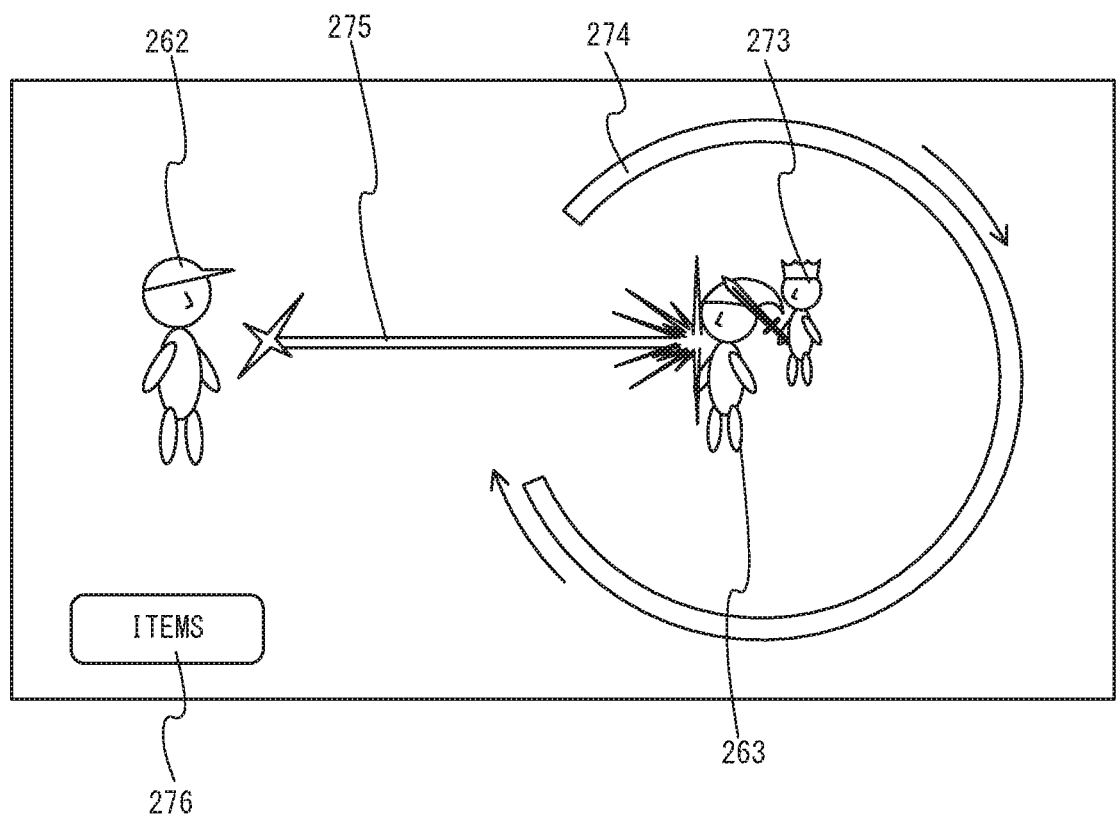
FIG. 14 is a diagram showing an example of a non-limiting additional game screen.
Figure 15:
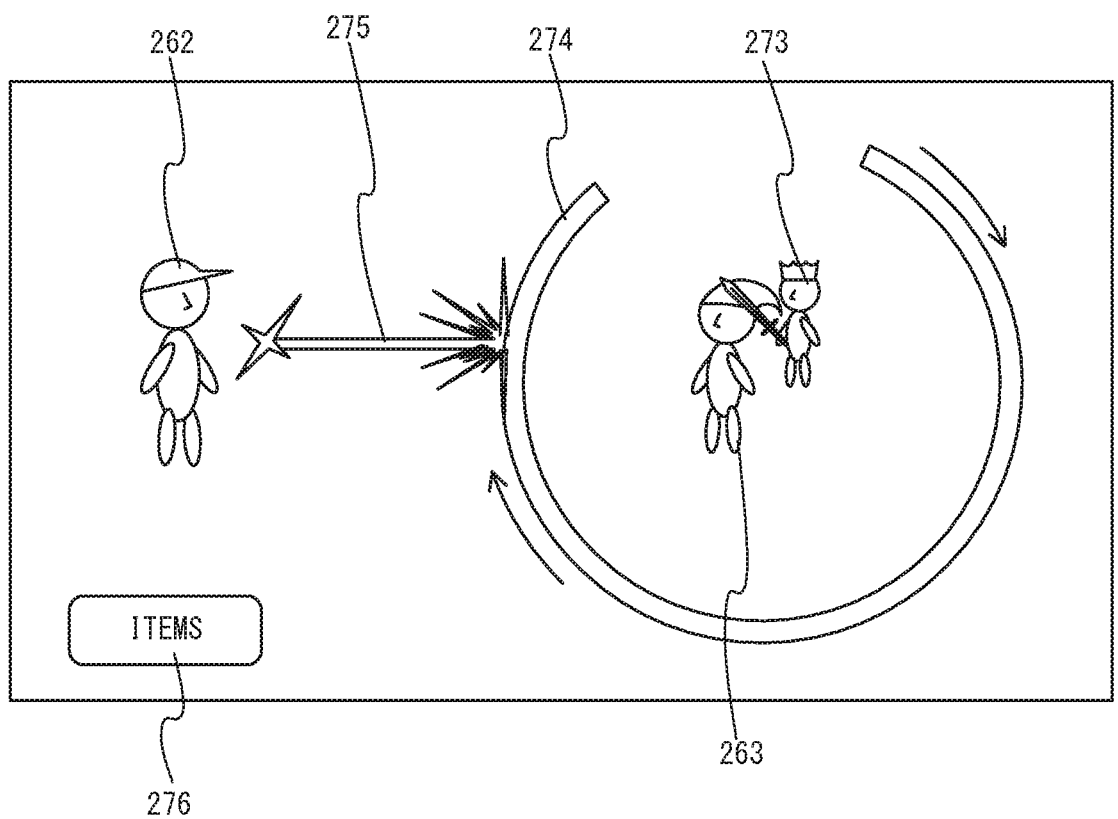
FIG. 15 is a diagram showing an example of a non-limiting additional game screen.
Figure 16:
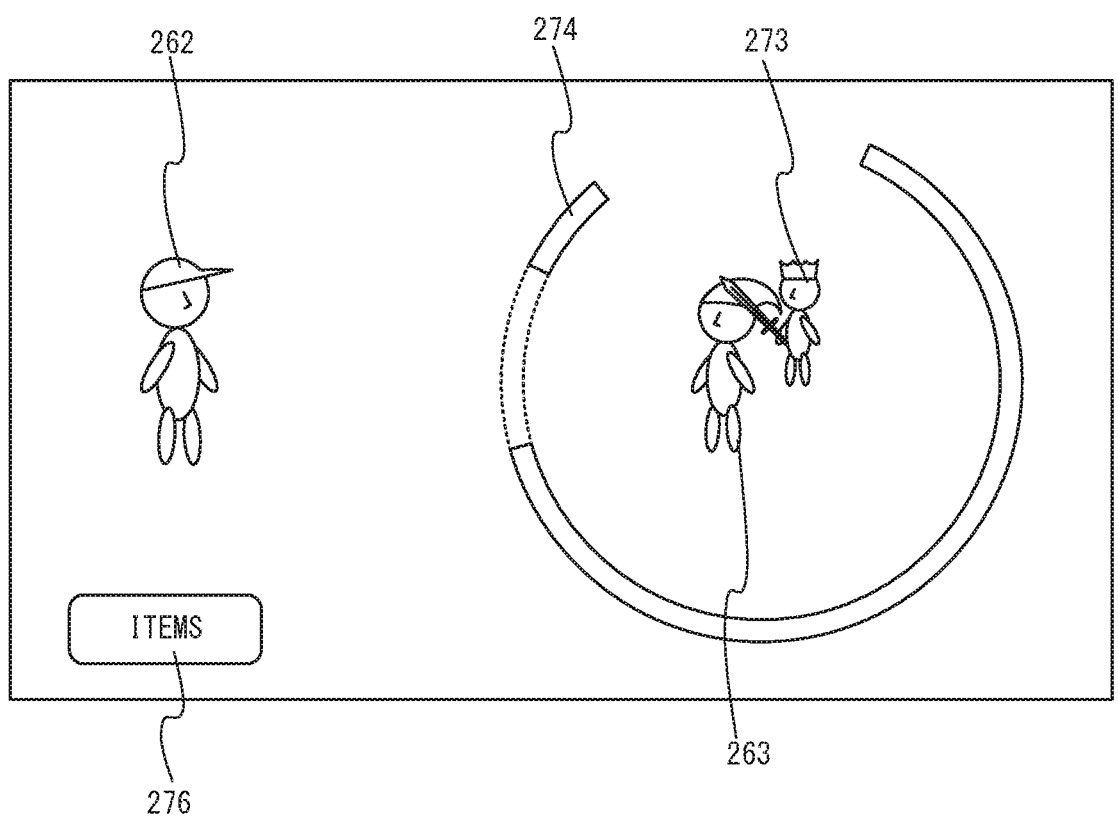
FIG. 16 is a diagram showing an example of a non-limiting additional game screen.

FIGS. 14-16 are diagrams showing an example additional game screen. As shown in FIGS. 14-16, in the additional game screen, the game system 1 displays the possessed character 262, the opponent character 263, and the opponent sub-character 273 that have been used in the competitive game. In the additional game screen, the game system 1 also displays a ring-shaped object 274 that is disposed, surrounding the opponent character and the opponent sub-character. The ring-shaped object 274 is in the shape of a circular ring a portion of which is cut away. Note that the ring-shaped object 274 represents a barrier for shielding from a beam 275 emitted by the possessed character 262.

In the additional game, the game system 1 rotates the ring-shaped object 274 around the opponent character 263 as a center of rotation (see an arrow shown in FIG. 14). As shown in FIG. 14, the game system 1 also causes the possessed character 262 to emit the beam 275 according to the user's predetermined input. Here, as described above, the ring-shaped object 274 is in the shape of a circular ring a portion of which is cut away. Therefore, as shown in FIG. 14, when the user performs an input with appropriate timing, the beam 275 hits the opponent character 263 without striking the ring-shaped object 274. In this case, the user wins the additional game. Meanwhile, as shown in FIG. 15, when the user performs an input with inappropriate timing, the beam 275 strikes the ring-shaped object 274 and does not hit the opponent character 263. In this case, the user loses the additional game.

As described above, in the exemplary embodiment, the game system 1 executes the timing game in which, based on the timing of the user's input, it is determined whether or not a giving condition is satisfied. Specifically, in the timing game, the game system 1 rotates an object, and determines whether or not the user has won the timing game, based on whether or not an orientation of the object determined based on the timing of the user's input is within a winning range (i.e., the ring-shaped object 274 is oriented in such a range that the beam 275 does not strike the ring-shaped object 274). Thus, by using the timing game having a relatively easy-to-understand rule as the additional game, the possibility that it is difficult for the user to understand a game operation for acquiring a sub-character can be reduced. In addition, in the exemplary embodiment, a type of game different from the competitive game is used as the additional game, and therefore, game amusingness in the acquisition game mode can be improved by a combination of the two different types of games.

Note that in another exemplary embodiment, the timing game may have any suitable content. For example, the timing game may be such that an object representing the needle of a roulette spins, the object stops spinning based on the user's input, and the user wins the game if the position or direction of the needle at rest is within a winning range (e.g., the needle stops at a position indicating a win). Alternatively, for example, the timing game may be such that the user performs an input for an operation of swinging a bat, to hit back an incoming ball.

FIG. 16 is a diagram showing an example of the additional game screen displayed if the user has lost the game. As described above, as shown in FIG. 16, when the beam 275 strikes the ring-shaped object 274 and therefore the user loses the game (see FIG. 15), a portion (i.e., a portion indicated by a dashed line in FIG. 16) of the ring-shaped object 274 which is struck by the beam 275 is broken and disappears. Thus, in the above situation, the game system 1 removes a portion of the ring-shaped object 274. This allows the beam 275 to be more likely to hit the opponent character 263, so that the difficulty of the additional game is reduced, and therefore, the user is more likely to win the additional game.

In the exemplary embodiment, the game system 1 stores a state of the ring-shaped object 274 (specifically, the shape of the ring-shaped object 274; in other words, a broken portion of the ring-shaped object 274) for each opponent sub-character. Therefore, next time the additional game is played for the opponent sub-character 273, the user will be more likely to win the additional game because the beam 275 can pass a larger portion of the ring-shaped object 274. Note that if the user has acquired an opponent sub-character, the state of the ring-shaped object 274 related to the opponent sub-character is reset (i.e., set to the initial state).

As described above, in the exemplary embodiment, when it is determined that the giving condition is not satisfied (i.e., the user has lost the additional game) and therefore a sub-character is not to be given to the user, an acquisition game (specifically, the additional game) is modified so that the giving condition is more likely to be satisfied (i.e., the difficulty is reduced) when that sub-character is selected again as a selected game object. Specifically, in the above situation, the game system 1 changes a game condition so that the giving condition is more likely to be satisfied. More specifically, the game system 1 executes the timing game with the wining range enlarged. Thus, by changing the additional game so that the giving condition is more likely to be satisfied, the situation that the user indefinitely loses the additional game is less likely to occur. This is also beneficial for the user who tries again to acquire a sub-character that the user has failed to acquire. Therefore, the user can be motivated to repeatedly use the acquisition game mode.

Note that in the exemplary embodiment, when a portion of the ring-shaped object 274 is struck by the beam 275, that portion is broken. Therefore, for example, the user may aim the beam 275 toward the ring-shaped object 274 so as to make a larger continuous opening in the ring-shaped object 274 so that even if the user loses the additional game, the user will have an advantage in the additional game next time. Also, even if the user loses the additional game, the user will be able to win the additional game next time with the same timing as that in the previous time. Thus, in the timing game of the exemplary embodiment, a strategic aspect can be imparted to the additional game, and the amusingness of the game can be further improved.

Note that a game condition may be changed so that the giving condition is more likely to be satisfied, using any suitable method including the method of the exemplary embodiment. For example, in another exemplary embodiment, in the case where a timing game similar to that of the exemplary embodiment is played, the game system 1 may change and slow the rotational speed of the ring-shaped object 274. In still another exemplary embodiment, in the case where the giving condition is satisfied when the use has won the competitive game, the game system 1 may change a game condition in the competitive game. For example, the game system 1 may change and strengthen a possessed character in the competitive game (e.g., may give an item to a possessed character), or may change and weaken an opponent character.

As shown in FIGS. 14-16, the additional game screen contains a game item instruction image 276. Specifically, the user can give an instruction to use a game item by performing an input for activating the game item instruction image 276. For example, when the game item instruction image 276 is activated, a window showing a list of game items is displayed, overlaying the additional game screen. The user performs an input for specifying one of the game items displayed in the window, and uses the specified game item.

In the exemplary embodiment, for example, the following items are prepared as the game items:

an item having the function of breaking a portion of the ring-shaped object 274;

an item having the function of slowing the rotational speed of the ring-shaped object 274; and an item having the function of increasing the maximum number of times the beam is emitted.

By using these game items, the user is more likely to win the additional game. Note that in another exemplary embodiment, instead of using a game item, the user may use the above functions by consuming points that are usable in the game (in-game currency). For example, in the game system 1, when the user has lost the additional game, the user may be allowed to play the additional game again provided that the user consumes game points possessed by the user.

As shown in FIG. 8, if the user has lost the additional game, the game system 1 does not execute a giving process described below (step S7), and executes the opponent selection process (step S1) again. In this case, the user has failed to acquire a sub-character. Note that in the above situation, the opponent selection process is executed again, and therefore, the user can select a sub-character again and continue to play the competitive game.

(Giving Process)

Meanwhile, if the user has won the additional game, the game system 1 executes a giving process (step S7). Specifically, the game system 1 gives the user an opponent sub-character that is a selected game object. Thus, in the exemplary embodiment, the giving condition under which a game object is given to the user is that the user wins both the competitive game and the additional game. Although not shown, in the giving process, displayed is a game screen that notifies the user that an opponent sub-character has been acquired. After the giving process, the user can play the competitive game using a sub-character that has been given to the user by the giving process. Specifically, the user can play the competitive game using the sub-character selected in the user selection process.

After the giving process, the game system 1 executes the opponent selection process (step S1) again. Therefore, the user is allowed to select a new sub-character and continue to play the competitive game.

As described above, in the exemplary embodiment, the game system 1 determines whether or not to give a selected game object (i.e., a sub-character) to the user (i.e., determines whether or not a giving condition is satisfied), and if the determination result is positive, gives the selected game object to the user. Thus, a selected game object is not simply given to the user, and is rather given to the user if a giving condition is satisfied. Therefore, the amusingness of the game in which the user is allowed to select a game object can be improved. Note that in the exemplary embodiment, the game system 1 determines to give a selected game object to the user if the results of the acquisition games (i.e., the competitive game and the additional game) satisfy the giving conditions, resulting in a further improvement in the amusingness of the game.

In the exemplary embodiment, the game system 1 also determines to give a selected game object to the user under at least a condition that the user plays at least the competitive game as an acquisition game and wins the competitive game. Thus, the game system 1 can provide a highly amusing game in which the process of allowing the user to select a game object is combined with the competitive game.

Note that the acquisition game for determining whether or not the giving condition is satisfied may have any suitable content, and is not limited to the competitive game and/or the additional game as described in the exemplary embodiment. For example, in another exemplary embodiment, the game system 1 may perform, as the acquisition game, a game in which a lottery is performed to determine whether or not a game object is to be given.

In the exemplary embodiment, a character (i.e., an opponent sub-character) that is a selected game object is used to enhance the performance of an opponent character. Specifically, the game system 1 executes the competitive game using a character (i.e., an opponent sub-character) that is a selected game object, as an opponent-side character. As a result, the user can acquire a character that the user desires to acquire, depending on the result of the competitive game in which the user competes with that character, and therefore, the amusingness of the competitive game can be improved.

Note that in the exemplary embodiment, the opponent in the competitive game is a character (i.e., an opponent character) associated with a selected game object (i.e., an opponent sub-character). Alternatively, in another exemplary embodiment, the opponent in the competitive game may be a character itself indicated by a selected game object. Thus, an opponent is uniquely determined based on a game object selected by the user, which allows the user to easily understand the opponent. Alternatively, in another exemplary embodiment, in the case where the opponent is a character associated with a selected game object, the selected game object may be a character that does not appear in the competitive game. For example, in another exemplary embodiment, in the competitive game, the opponent may be a character associated with a selected game object, and the selected game object may not be used in the competitive game.

In the exemplary embodiment, in addition to the competitive game, the game system 1 executes the additional game if the user has won the competitive game. If the result of the additional game satisfies a giving condition, the game system 1 determines to give a selected game object to the user. Thus, a selected game object is given to the user, depending on the results of the two types of games, and therefore, the amusingness of the game can be further improved. Note that in another exemplary embodiment, the additional game may be played prior to the competitive game. Specifically, the game system 1 may execute the competitive game if the user has won the additional game, and if the result of the competitive game satisfies a condition, may determine to give a selected game object to the user.

[2-2. Replacement of Selection Candidate]

Replacement of a candidate game object shown in the opponent selection screen (i.e., a candidate for a sub-character to be selected as a selected game object by the user) will be described with reference to FIGS. 17 and 18. In the exemplary embodiment, a sub-character shown in the opponent selection screen is replaced by another sub-character in the following cases:

the remaining time set for the sub-character has expired;

the sub-character has been given to the user, or the user has lost the competitive game using the sub-character; and a replacement item has been used.

As described in detail below, in the exemplary embodiment, a replacing candidate game object is randomly chosen.

Therefore, in the exemplary embodiment, a candidate game object may accidentally be replaced by the same as that candidate game object. Thus, as used herein, the term "replace" means that a new candidate game object is set, and the phrase "replace a candidate game object" has a meaning including a replacement method in which a candidate game object may be replaced by the same as that candidate game object.

(Replacement Depending on Remaining Time)

In the exemplary embodiment, if a remaining time for a sub-character that is a candidate game object has expired (i.e., the remaining time is zero), the game system 1 replaces the sub-character with another sub-character.

Figure 17:
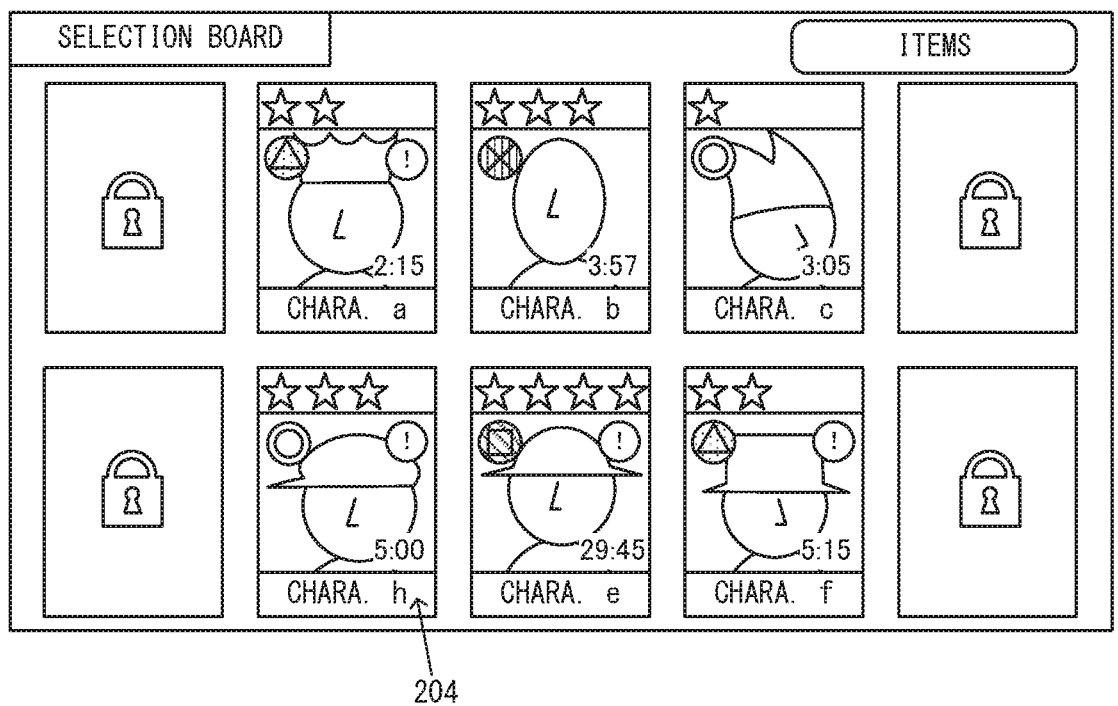
FIG. 17 is a diagram showing an example of a non-limiting opponent selection screen after replacement.

FIG. 17 is a diagram showing an example of the opponent selection screen after replacement. The opponent selection screen of FIG. 17 is 15 seconds after the opponent selection screen of FIG. 9, and at that time, the remaining time of a sub-character displayed in the sub-character region 204 is zero. Specifically, in the opponent selection screen of FIG. 17, the sub-character displayed in the sub-character region 204, which is called "Chara. d," has been replaced by a sub-character called "Chara. h."

In the exemplary embodiment, the remaining time is managed for each sub-character that is a candidate game object. Specifically, the game system 1 measures the remaining time for each sub-character. Here, in the exemplary embodiment, the game system 1 manages the remaining time such that the remaining time decreases as the real time passes. Specifically, the remaining time decreases not only when the opponent selection screen is being displayed, but also in the acquisition game mode, in which the opponent selection screen is not being displayed, and for a period of time that the game system 1 is not in the acquisition game mode. Furthermore, the remaining time is calculated to decrease for a period of time that a game program is not being executed (note that the calculation of the remaining time is performed during execution of the game program). Although a method for calculating the remaining time is described in detail below (see step S34), for example, the game system 1 stores time that the display of the opponent selection screen is ended, in association with the remaining time at that time, and calculates the remaining time using the difference between time that the opponent selection screen is displayed next time, and the stored time, so that the remaining time decreases during a period of time that a game program is not being executed.

As described above, the game system 1 reduces the remaining time of a candidate game object as time passes, irrespective of whether or not the candidate game object can be viewed by the user. As a result, a sub-character is replaced even during a period of time that the opponent selection screen is not being displayed and during a period of time that the game system 1 is not in the acquisition game mode. Therefore, the user can be motivated to frequently check the opponent selection screen, and therefore prompted to use the acquisition game mode.

Note that in another exemplary embodiment, the remaining time may be managed to decrease in the acquisition game mode and to not decrease for a period of time that the game system 1 is not in the acquisition game mode. Alternatively, the remaining time may be managed to decrease during execution of a game program and to not decrease for a period of time that a game program is not being executed. Even in these embodiments, "the remaining time of a candidate game object can be reduced as time passes, irrespective of whether or not the candidate game object can be viewed by the user," and therefore, as in the exemplary embodiment, the user can be motivated to frequently check the opponent selection screen.

In addition, a replacing sub-character that is a candidate game object may be chosen using any suitable method. In the exemplary embodiment, the game system 1 chooses a game object from those prepared in the competitive game, by a lottery according to a lottery rule, and sets the game object as a candidate game object. This allows a variety of sub-characters to be shown as candidate game objects to the user, and therefore, the user is less likely to be bored with sub-character line-ups shown thereto.

The above lottery may be performed according to any suitable rule. In the exemplary embodiment, a rule based on probability is used (in other words, a sub-character is randomly chosen). As used herein, the term "randomly" with respect to choosing a sub-character, etc., does not mean in strict sense that the sub-character is exactly randomly chosen, and means that the sub-character is probabilistically selected so that a different sub-character is chosen each time in the case where selection is performed a plurality of times. Specifically, as to the lottery rule, a sub-character may be exactly randomly chosen, or a sub-character may be randomly chosen using a predetermined weight or under a predetermined condition. For example, a sub-character may be randomly chosen under a condition that the probability that a sub-character having a higher rarity is chosen is set lower.

Note that in the exemplary embodiment, the game system 1 chooses a sub-character from all sub-characters prepared in the competitive game. Alternatively, in another exemplary embodiment, a sub-character that has already been acquired by the user can no longer be chosen.

The game system 1 may choose a sub-character with any suitable timing. In the exemplary embodiment, the game system 1 may choose a sub-character that is to be set as a replacing candidate game object next time, previously before the remaining time expires, and may set the previously chosen sub-character as a candidate game object when replacement occurs. Specifically, the game system 1 may choose a predetermined number of sub-characters that are to be set, at predetermined intervals (e.g., 1 week) and/or each time the game program of the competitive game is started. In this case, each time replacement occurs, the game system 1 sequentially sets the predetermined number of sub-characters already chosen, as candidate game objects. Thus, the game system 1 may previously determine the order (in other words, a schedule) in which a sub-character is chosen as a candidate game object. Note that in another exemplary embodiment, upon replacement (or immediately before replacement occurs), the game system 1 may choose a sub-character that is to be set as a replacing candidate game object.

In the exemplary embodiment, the remaining time of a sub-character at the time that the sub-character has just been set as a candidate game object (in other words, the remaining time at the initial time point) is set for each sub-character. For example, the game system 1 may set the remaining time of a sub-character at the initial time point that has a length corresponding to the rarity of the sub-character. Here, in the exemplary embodiment, the remaining time also decreases for a period of time that the opponent selection screen is not being displayed. Therefore, for some sub-characters, the remaining time also decreases for a period of time that the opponent selection screen is not being displayed, and therefore, when the opponent selection screen is displayed, the remaining time is so short that it may be difficult for the user to select those sub-characters. Therefore, the game system 1 may set the remaining time at the initial time point such that a sub-character having a higher rarity has a longer remaining time at the initial time point than that of a sub-character having a lower rarity. This can reduce the possibility that the user cannot select a sub-character having a high rarity.

Note that the remaining time at the initial time point may be set using any suitable method. For example, in another exemplary embodiment, the game system 1 may set the same remaining time at the initial time point for all sub-characters. In still another exemplary embodiment, the game system 1 may set the remaining time at the initial time point such that a sub-character having a higher rarity has a shorter remaining time at the initial time point than that of a sub-character having a lower rarity. In other words, while, in the exemplary embodiment, the reduction in choice probability makes it more difficult to acquire a sub-character having a higher rarity, in another exemplary embodiment a period of time for which a sub-character having a higher rarity is displayed in the opponent selection screen may be reduced to make it more difficult to acquire such a sub-character. The remaining time at the initial time point may not be set for every sub-character. For example, the remaining time at the initial time point may be randomly set each time a sub-character is set as a candidate game object (i.e., the remaining time of the same sub-character at the initial time point may be set to a different value each time).

As described above, in the exemplary embodiment, the remaining time of a sub-character may expire during a period of time that the sub-character is not being displayed in the opponent selection screen. In the exemplary embodiment, in this case, next time the opponent selection screen is displayed, the game system 1 shows a display of replacement of that game object by a new game object. Specifically, in the above case, the game system 1 displays an animation in which information about a sub-character that is to be replaced is temporarily displayed in a sub-character region, and thereafter, information about a replacing sub-character is displayed in the sub-character region.

In the above case, the remaining time of the replacing sub-character may be calculated to start decreasing from the time that the remaining time of the sub-character before replacement has just expired, or from the time that the opponent selection screen has just been displayed (or the time that the animation has just been ended).

Note that the game system 1 does not set a sub-character that is to be replaced, as a selected game object, even when the sub-character region is activated during a period of time that the animation is displayed. Specifically, the game system 1 may not receive an input for activating the sub-character region during a period of time that the animation is displayed, or may set a replacing sub-character as a selected game object when an input for activating the sub-character region is performed.

As described above, when the remaining time of a candidate game object expires during a period of time that the candidate game object is not viewable to the user (e.g., a period of time that the candidate game object is not being displayed in the opponent selection screen), the game system 1 may change an image showing the candidate game object to an image showing a newly set one of the game objects prepared in the competitive game, when the candidate game object is made viewable to the user (e.g., the opponent selection screen is displayed). This allows the user to know that replacement occurs because the remaining time has expired during the above period of time, in an easy-to-understand manner.

(Replacement in Response to Giving or Losing Game)

In the exemplary embodiment, if a sub-character that is a selected game object has been given to the user, the game system 1 replaces the sub-character. As a result, in the opponent selection screen, after a sub-character has been given, another sub-character can be added, and therefore, a larger number of selection candidates (in other words, candidate game objects) can be provided to the user. Note that in another exemplary embodiment, the game system 1 may replace a sub-character if that sub-character has been selected as a selected game object (irrespective of whether or not the giving condition is satisfied). As a result, as in the exemplary embodiment, a larger number of selection candidates can be provided to the user.

Note that in another exemplary embodiment, it may, for example, be beneficial in the game to acquire a plurality of the same sub-characters (e.g., the same sub-characters may be combined together to strengthen the sub-characters). In such a case, the user may repeatedly select the same sub-character as a selected game object. Therefore, in the above situation, even if a sub-character that is a selected game object has been given to the user, the game system 1 may not replace the sub-character.

In the exemplary embodiment, when the user has lost the competitive game, the game system 1 also replaces a sub-character used in the competitive game in that case. Thus, when the user has lost the competitive game, the user cannot acquire that sub-character (selected game object) (at least until that sub-character is chosen as a candidate game object next time), so that the tension of the user in the competitive game can be increased, and therefore, the amusingness of the competitive game can be improved.

Note that in another exemplary embodiment, when the user has lost the competitive game, the game system 1 may not replace a sub-character. In this case, the user is allowed to select a sub-character for which the user has lost the competitive game, as a selected game object, again, and compete with the sub-character again.

As described above, in the exemplary embodiment, when giving or game loss has occurred as to a sub-character that is a selected game object (i.e., when the sub-character has been given to the user by the giving process, or when the user has lost the competitive game in which the sub-character was used), the game system 1 replaces the sub-character. Here, in the exemplary embodiment, in the above situation, (unlike the case where the remaining time has expired), the game system 1 shows a replacing sub-character after a predetermined waiting time has passed. Specifically, after the waiting time has passed from the time that a sub-character was given to the user or the time that the user lost the competitive game, a replacing sub-character is shown.

Note that in the exemplary embodiment, the waiting time is set constant (specifically, 5 minutes) irrespective of the type of a sub-character. Note that the waiting time may be set using any suitable method. In another exemplary embodiment, the length of the waiting time may be varied depending on the type of a sub-character, for example. In still another exemplary embodiment, the waiting time may have a different length between the case where a sub-character has been given and the case where the user has lost the competitive game in which a sub-character was used.

Figure 18:
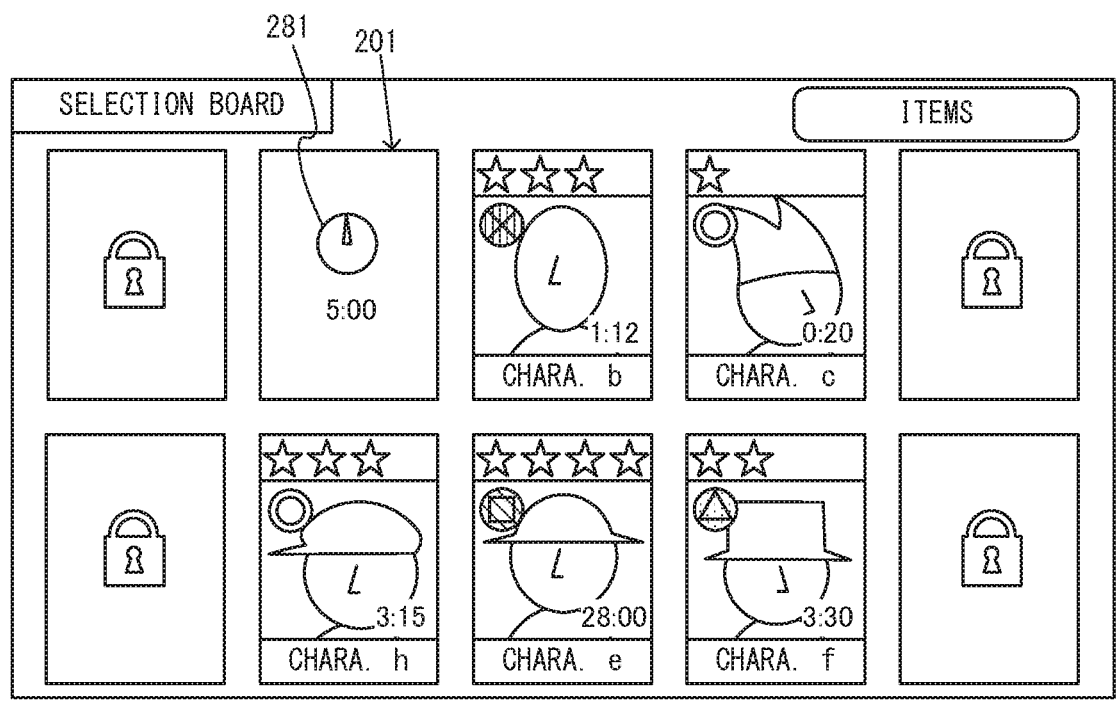
FIG. 18 is a diagram showing an example of a non-limiting opponent selection screen that is displayed before a waiting time has passed.

FIG. 18 is a diagram showing an example of the opponent selection screen that is displayed before the waiting time has passed. The opponent selection screen of FIG. 18 is displayed after giving or game loss has occurred as to a sub-character displayed in the sub-character region 201 of the opponent selection screen of FIG. 9. As shown in FIG. 18, when giving or game loss has occurred as to a sub-character, an image 281 indicating a waiting period that is before the waiting time has passed is displayed in the sub-character region 201 for the sub-character. In the sub-character region 201, information indicating a remaining waiting time that is a remaining time until the end of the waiting period (in FIG. 18, "5:00" (5 minutes)) is displayed. As a result, the game system 1 can notify the user that the sub-character region 201 is currently in the waiting period until the next candidate game object is displayed, and can also notify the user of the remaining waiting time. Note that during the waiting period, the user is not allowed to select a sub-character corresponding to the sub-character region 201 as a selected game object.

After the waiting time, i.e. 5 minutes, has passed from the opponent selection screen of FIG. 18, the game system 1 shows a sub-character that is a replacing candidate game object. Specifically, in the sub-character region 201, information about a replacing candidate game object is displayed.

As described above, when a selected game object has been given to the user, the game system 1 newly sets one of the sub-characters prepared in the competitive game as a candidate game object after the waiting time has passed. As a result, for a period of time until the next candidate game object is shown, the user is allowed to select one of the sub-characters shown in the opponent selection screen, as a candidate, except for the sub-character selected as a selected game object. Thus, according to the exemplary embodiment, the game system 1 can prompt the user to select, as a selected game object, one from sub-characters that have not yet been selected.

Also, in the exemplary embodiment, as in the case where a selected game object has been given to the user, when the user has lost the competitive game, the waiting time is also set. Therefore, when the user has lost the competitive game, the game system 1 can also prompt the user to select, as a selected game object, one from sub-characters that have not yet been selected.

Note that in another exemplary embodiment, when giving or game loss has occurred as to a sub-character, the game system 1 may immediately show a replacing sub-character in the opponent selection screen without setting the waiting time.

As described above, in the exemplary embodiment, as shown in FIG. 8, a sub-character that is a selected game object is replaced: (a) if the user has won both the competitive game and the additional game; and (b) if the user has lost the competitive game. Meanwhile, a sub-character that is a selected game object is not replaced: (c) if the user has won the competitive game and has lost the additional game (see FIG. 8). Specifically, in the exemplary embodiment, when the user has won the competitive game, and the result of the additional game does not satisfy the giving condition, the game system 1 maintains the selected game object set as a candidate game object, provided that the remaining time of the selected game object is not zero. This is beneficial to the user who has won the competitive game, compared to when the user has lost the competitive game (i.e., an advantage that the selected game object is not replaced). Thus, the game system 1 can improve the amusingness of the game in which a game object is given based on the game results of the competitive game and the additional game.

Here, in the exemplary embodiment, as described above, when the user has lost the additional game for a sub-character, the user is given an advantage that the user is more likely to win the additional game for that sub-character next time. Therefore, when the user has won the competitive game for a sub-character and has lost the additional game for that sub-character, the user may select the same sub-character again to take the above advantage. Thus, in the exemplary embodiment, in the case of (c), the replacement is not performed, so that the user who has lost the additional game can easily take the above advantage.

(Replacement in Response to Use of Item)

In the exemplary embodiment, if the user has used a predetermined replacement item, the game system 1 performs replacement of candidate game objects (i.e., sub-characters) that are shown in the opponent selection screen. Note that as shown in FIG. 9, the opponent selection screen contains an item instruction image 216 for giving an instruction to use a replacement item. Specifically, the user can give an instruction to use a replacement item by performing an input for activating the item instruction image 216. For example, when the item instruction image 216 is activated, a window indicating a list of replacement items is displayed, overlaying the opponent selection screen. The user uses a replacement item by performing an input for activating the replacement item displayed in the window.

In the exemplary embodiment, for example, the following replacement items are prepared:

an item having the function of replacing all candidate game objects shown in the opponent selection screen;

an item having the function of performing replacement so that only a particular type (e.g., the first type) of sub-character is displayed (note that when this item has been used, a replacing sub-character that is of the particular type is chosen); and an item having the function of setting a sub-character before replacement as a candidate game object again in a sub-character region for which the waiting period is currently set.

By using these replacement items, the user can increase the possibility that a desired sub-character is shown as a candidate game object. Note that in another exemplary embodiment, instead of using the replacement items, the user may perform replacement of a candidate game object by consuming points (including in-game currency) usable in the game.

As described above, in the exemplary embodiment, the game system 1 performs replacement of at least one selectable game currently set by activating a replacement item specified by the user or consuming a game parameter (i.e., a parameter indicating the points). As a result, a candidate game object desired by the user is more likely to be shown, resulting in an improvement in the user's convenience.

[3. Specific Example of Process in Game System]

i. Next, a specific example of an information process in the game system 1 will be described with reference to FIGS. 19-21.

[3-1. Data Used in Information Process]

Figure 19:
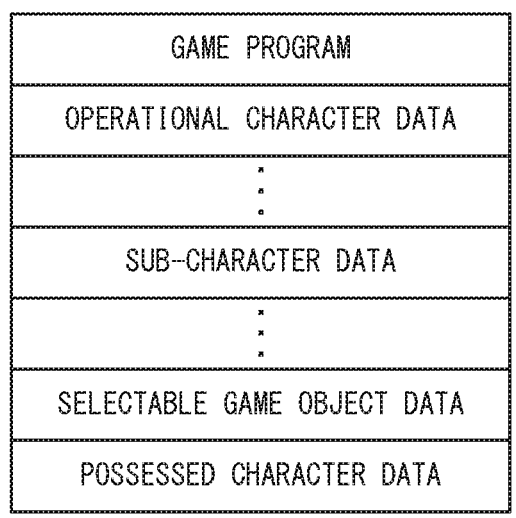
FIG. 19 is a diagram showing an example of various pieces of data used in an information process in a non-limiting game system 1.

FIG. 19 is a diagram showing an example of various pieces of data used in an information process in the game system 1. The various pieces of information shown in FIG. 19 are stored in a storage medium (e.g., the flash memory 84, the DRAM 85, and/or a memory card inserted in the slot 23) that can be accessed by the main body apparatus 2.

As shown in FIG. 19, the game system 1 stores a game program. The game program is for executing a game application including the acquisition game mode in the exemplary embodiment, and is stored in, for example, the flash memory 84, the DRAM 85, and/or a memory card inserted in the slot 23.

As shown in FIG. 19, the game system 1 also stores operational character data and sub-character data. These pieces of data may be stored together with the game program in a storage medium.

The operational character data is related to an operational character that is prepared (in other words, can be used) in the competitive game. The operational character data includes data indicating various pieces of information about an operational character (e.g., an image and various parameters related to an operational character). In the exemplary embodiment, a plurality of operational characters are prepared, and the game system 1 stores operational character data for each operational character.

The sub-character data is related to a sub-character prepared in the competitive game. The sub-character data includes various pieces of information related to the sub-character (e.g., an image and various parameters related to the sub-character). The sub-character data also includes data indicating a game state (specifically, the shape of the ring-shaped object 274) in the additional game that is related to the sub-character. In the exemplary embodiment, a plurality of sub-characters are prepared, and the game system 1 stores the sub-character data for each sub-character.

As shown in FIG. 19, the game system 1 also includes candidate game object data and possessed character data. These pieces of data (in other words, information) are generated and used in a game process executed by the game program (see FIGS. 20 and 21). Note that in addition to the data shown in FIG. 19, the storage medium stores various pieces of data that are used in a game process executed by the game program.

The candidate game object data indicates a candidate game object that is currently set. Specifically, the candidate game object data includes data related to a sub-character displayed in each sub-character region of the opponent selection screen. Note that the "data related to a sub-character" includes data indicating an identifier of the sub-character, and data indicating the remaining time of the sub-character. The candidate game object data also includes data related to a waiting period for each sub-character region. Note that the "data related to a waiting period" includes data indicating whether or not a sub-character region is during the waiting period, and data indicating a remaining waiting time set for the sub-character region when the sub-character region is during the waiting time.

The possessed character data indicates a sub-character possessed by the user of the sub-characters prepared in the competitive game. Specifically, the possessed character data includes data indicating an identifier of a sub-character possessed by the user.

[3-2. Processes Executed in Game System]

Figure 20:
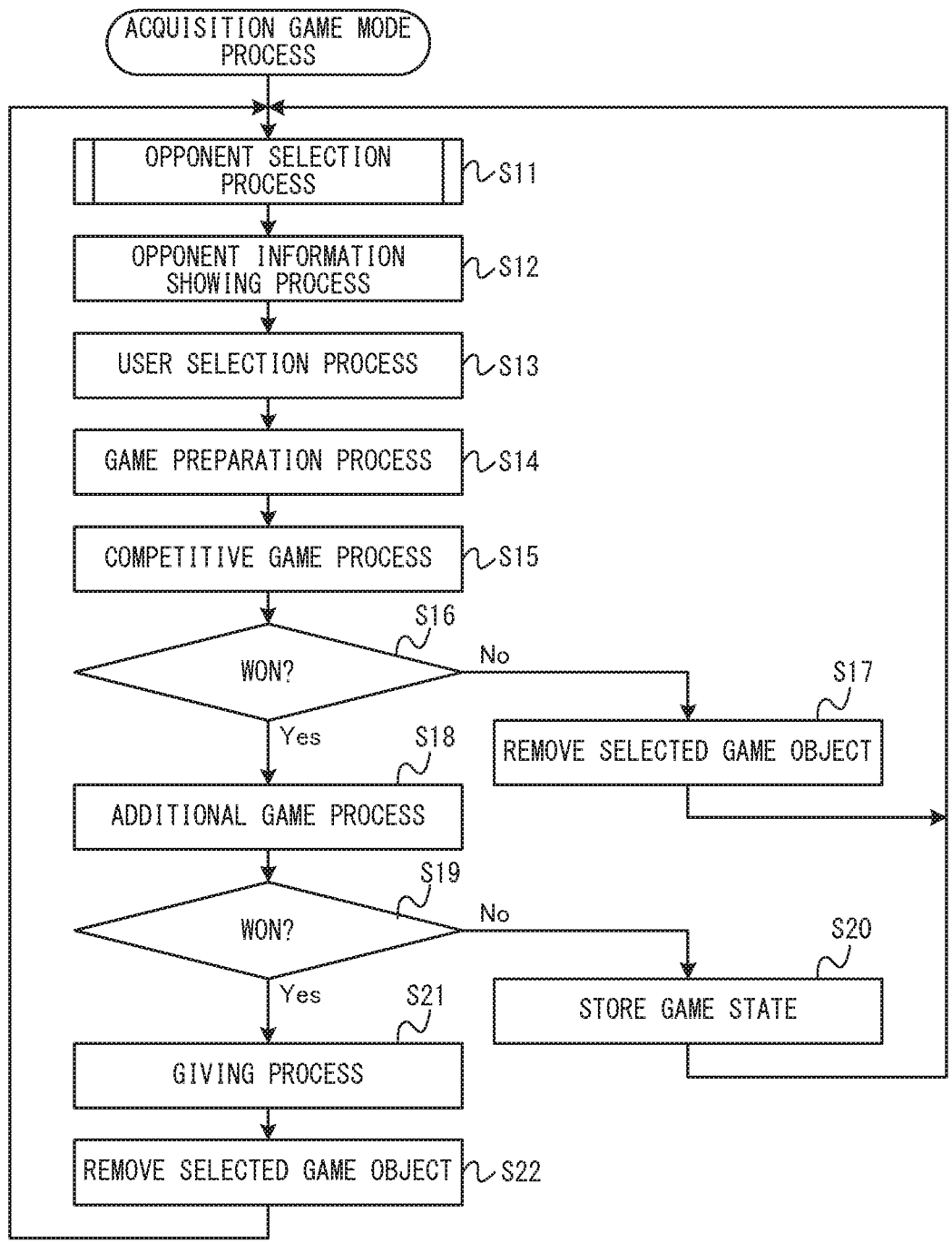
FIG. 20 is a flowchart showing an example information process executed by a non-limiting game system 1.
Figure 21:
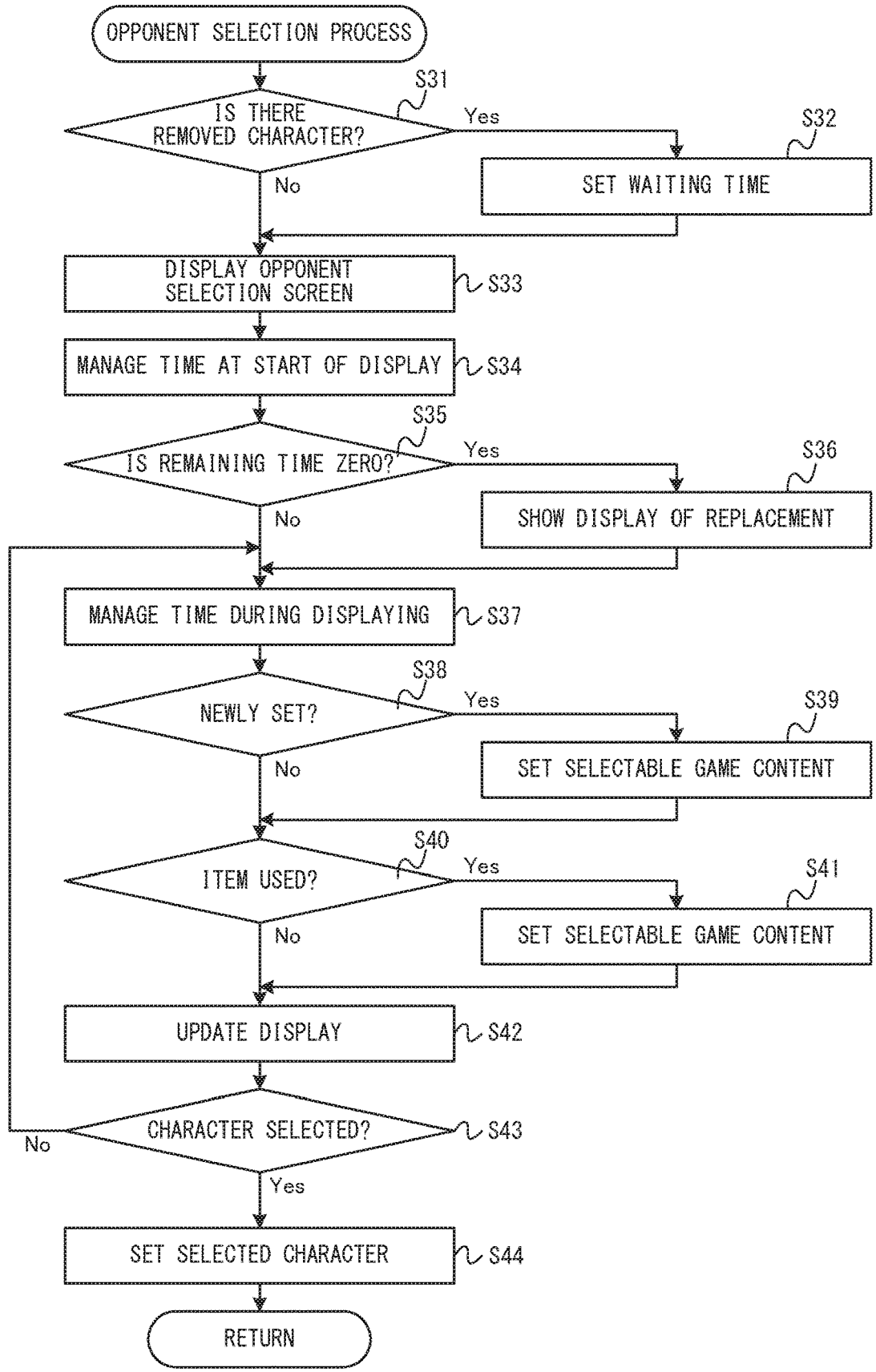
FIG. 21 is a sub-flowchart showing an example detailed flow of an opponent selection process of step S11 shown in FIG. 20.

FIGS. 20 and 21 are flowcharts showing example information processes executed by the game system 1. A series of steps shown in FIGS. 20 and 21 is executed in the acquisition game mode. Specifically, the series of steps of FIGS. 20 and 21 is started in response to the user's instruction to start the acquisition game mode during execution of the game program.

Note that in the exemplary embodiment, it is assumed that the processor 81 of the main body apparatus 2 executes the game program stored in the game system 1 to execute each step of FIGS. 20 and 21. Note that in another exemplary embodiment, a portion of the steps may be executed by a processor (e.g., a dedicated circuit) other than the processor 81. In the case where the game system 1 can communicate with another information processing device (e.g., a server), a portion of the steps of FIGS. 20 and 21 may be executed by the information processing device. The steps of FIGS. 20 and 21, which are merely for illustrative purposes, may be executed in a different order, or another step may be executed in addition to (or instead of) each step, if a similar effect is obtained.

The processor 81 executes the steps of FIGS. 20 and 21 using a memory (e.g., the DRAM 85). Specifically, the processor 81 stores information (in other words, data) obtained in each process step into a memory, and reads the information from the memory when the information is required in a subsequent process step.

In step S11 of FIG. 20, the processor 81 executes the opponent selection process (step S1 of FIG. 8). In the opponent selection process, the user selects a selected game object (i.e., an opponent sub-character). Note that a detailed process flow of the opponent selection process is described below with reference to FIG. 21. Following step S11, step S12 is executed.

In step S12, the processor 81 executes the opponent information showing process (step S2 of FIG. 8). Specifically, the processor 81 generates the opponent information screen (see FIG. 10) using the method described in the above section "(Opponent information showing process)," and causes the display device to display the opponent information screen. The processor 81 also receives the user's input of a change instruction to change the display of the display device from the opponent information screen to the user's character selection screen. Note that in the exemplary embodiment, the processor 81 receives the user's input as follows: the processor 81 acquires data indicating an input performed on an input unit (e.g., the touch panel 13, a button of a game controller, and/or an analog stick of a game controller, etc.) of the game system 1, and based on the acquired data, determines the presence or absence of an input and the value of the input. If the input of the change instruction has been performed, the processor 81 ends step S12, and executes step S13.

In step S13, the processor 81 executes the user selection process (step S3 of FIG. 8). Specifically, the processor 81 generates the user's character selection screen (see FIG. 11), causes the display device to display the user's character selection screen, and selects a possessed character and a possessed sub-character according to the user's instruction, using the method described in the above section "(User selection process)." The processor 81 also receives the user's input of a start instruction to start the competitive game. If the change instruction has been input, the processor 81 ends step S13, and executes step S14.

In step S14, the processor 81 executes the game preparation process (step S4 of FIG. 8). Specifically, the processor 81 generates the competition confirmation screen (see FIG. 12) using the method described in the above section "(Game preparation process)," and causes the display device to display the competition confirmation screen. The processor 81 displays the competition confirmation screen for a predetermined period of time, and thereafter, automatically (i.e., without the user's instruction) ends step S14 and executes step S15.

In step S15, the processor 81 executes the competitive game process (step S5 of FIG. 8). Specifically, the processor 81 executes an information process for the competitive game using the method described in the above section "(Competitive game process)." For example, the processor 81 receives the user's operational input, controls an action of a possessed character in a game space according to the operational input, generates the competitive game screen (see FIG. 13), and causes the display device to display the competitive game screen. If the competitive game is ended, the processor 81 ends step S15 and executes step S16.

In step S16, the processor 81 determines whether or not the user has won the competitive game in step S15. If the determination result of step S16 is negative (i.e., the user has lost), step S17 is executed. Otherwise, i.e. if the determination result of step S16 is positive, step S18 is executed.

In step S17, the processor 81 removes the sub-character that is a selected game object from the candidate game objects currently set. Specifically, the processor 81 updates the contents of the candidate game object data stored in the storage medium such that the candidate game object data indicates that the sub-character corresponding to the selected game object is during the waiting period. As a result, next time the opponent selection screen is displayed, information indicating that the sub-character corresponding to the selected game object is during the waiting period will be displayed in the sub-character region corresponding to the selected game object, instead of information about the sub-character (see the sub-character region 204 of FIG. 18). After step S17, the opponent selection process of step S11 is executed again.

In step S18, the processor 81 executes the additional game process (step S6 of FIG. 8). Specifically, the processor 81 executes an information process for the additional game using the method described in the above section "(Additional game process)." For example, the processor 81 receives the user's operational input, and generates the additional game screen (see FIG. 14) and causes the display device to display the additional game screen. After the end of the additional game, the processor 81 ends step S18 and executes step S19.

In step S19, the processor 81 determines whether or not the user has won the additional game in step S18. In the exemplary embodiment, by performing the determination processes of steps S17 and S19, it is determined whether or not the giving condition is satisfied. If the determination result of step S19 is negative, step S20 is executed. Otherwise, i.e. if the determination result of step S19 is positive, step S21 is executed.

In step S20, the processor 81 stores a game state (specifically, the shape of the ring-shaped object 274) that has occurred in the additional game performed in step S18. Specifically, the processor 81 updates the contents of the sub-character data stored in the storage medium so as to incorporate thereinto data indicating the game state occurring in the additional game. Therefore, if the game state has been changed in step S18, the changed game state is stored, and therefore, next time the additional game is executed for the same sub-character, the game condition will have been changed. After step S20, the opponent selection process of step S11 is executed again.

In step S21, the processor 81 executes the above process (step S7 of FIG. 8). At this time, the processor 81 updates the possessed character data stored in the storage medium so as to incorporate thereinto data indicating the sub-character that is a selected game object. As a result, the sub-character is given to the user, and thereafter, the user can play the competitive game using the sub-character. Following step S21, step S22 is executed.

In step S22, the processor 81 removes the sub-character that is a selected game object from the candidate game objects currently set. The process of step S22 is the same as the process of step S17. After step S22, the opponent selection process of step S11 is executed again.

Although not shown in FIG. 20, the processor 81 receives the user's end instruction during a predetermined period of time in the additional game mode, and in response to the end instruction, ends the series of processes in the acquisition game mode. Note that the predetermined period of time is not particularly limited, and may, for example, be the entire period of time of the acquisition game mode, or a period of time that a predetermined game screen (e.g., the opponent selection screen, the opponent information screen, and the user's character selection screen) is displayed.

FIG. 21 is a sub-flowchart showing an example of a detailed flow of the opponent selection process of step S11 of FIG. 20. In the opponent selection process, initially, in step S31, the processor 81 determines whether or not there is a sub-character that has been removed from the candidate game objects due to loss in the competitive game (step S17) or a sub-character that has been removed from the candidate game objects because that sub-character has been given to the user (step S22). If the determination result of step S31 is positive, step S32 is executed. Otherwise, i.e. if the determination result of step S31 is negative, step S32 is skipped and step S33 is executed.

In step S32, the processor 81 sets a waiting time for a sub-character region corresponding to the removed sub-character. Specifically, the processor 81 updates the contents of the candidate game object data stored in the storage medium so as to incorporate thereinto data indicating that the sub-character region corresponding to the removed sub-character is during the waiting period, and data indicating a waiting time (here, 5 minutes) set for the sub-character region. Following step S32, step S33 is executed.

In step S33, the processor 81 generates the opponent selection screen (see FIGS. 9, 17, and 18), and causes the display device to display the opponent selection screen. At this time, information indicating that it is currently during a waiting period is displayed in the sub-character region for which a waiting time has been set in step S32 (see the sub-character region 204 of FIG. 18). Following step S33, step S34 is executed.

In step S34, the processor 81 executes a time management process at the start of displaying the opponent selection screen. Here, in the exemplary embodiment, a time that should be displayed in the opponent selection screen (specifically, the remaining time and the remaining waiting time) are managed such that the time decrease as the real time passes. Specifically, at the time of step S34, the displayed time has advanced from those previously displayed in the opponent selection screen. Therefore, in step S34, in order to determine the current displayed time in the opponent selection screen, the processor 81 calculates how much time has advanced from those previously displayed in the opponent selection screen as the real time has passed. The displayed time may be calculated using any suitable method, and may be calculated based on the real time (or time that advances according to the real time). For example, the processor 81 stores, at an appropriate time point, the displayed time in the opponent selection screen in association with that time point. In step S34, the processor 81 subtracts the difference between the most recently stored time and the current time from the most recently stored displayed time to calculate the current displayed time. Thus, the remaining time and the remaining waiting time at the time of starting the display of the opponent selection screen can be calculated. Note that the time stored in association with the displayed time does not need to be exactly consistent with the real time, and alternatively, may, for example, be time that is managed in the game system 1 (may not be consistent with the real time). Following step S34, step S35 is executed.

In step S35, the processor 81 determines whether or not there is a sub-character whose remaining time has expired during a period of time that the opponent selection screen was not being displayed. Specifically, the processor 81 determines whether or not there is a sub-character for which the displayed time calculated in step S34 is not greater than zero. If the determination result of step S35 is positive, step S36 is executed. Otherwise, i.e. if the determination result of step S35 is negative, step S36 is skipped and step S37 is executed.

In step S36, the processor 81 shows a display of replacement of a sub-character whose remaining time has expired, in the opponent selection screen, using the method described in the above section "(Replacement depending on remaining time)." Following step S36, step S37 is executed.

In step S37, the processor 81 executes the time management process during displaying of the opponent selection screen. Specifically, the processor 81 decreases the displayed time (i.e., the remaining time and the remaining waiting time) that is being displayed in the opponent selection screen as time passes (in other words, counting down). Following step S37, step S38 is executed.

In step S38, the processor 81 determines whether or not to newly set a candidate game object. The determination process of step S38 is for determining whether or not the remaining time of a sub-character or the remaining waiting time of a sub-character region has expired during displaying of the opponent selection screen. Specifically, the processor 81 determines whether or not there is a sub-character for which the displayed time calculated in step S37 is not greater than zero. If the determination result of step S38 is positive, step S39 is executed. Otherwise, i.e. if the determination result of step S38 is negative, step S39 is skipped and step S40 is executed.

In step S39, the processor 81 newly sets a sub-character as a candidate game object. Specifically, the processor 81 sets a sub-character previously chosen using the method described in the above section "(Opponent selection process)" as a candidate game object, for the sub-character region of a sub-character whose remaining time has expired or a sub-character region whose remaining waiting time has expired. Specifically, the processor 81 updates the contents of the candidate game object data stored in the storage medium so as to incorporate thereinto the newly set sub-character instead of the sub-character before replacement. Following step S39, step S40 is executed.

In step S40, the processor 81 determines whether or not the user has given an instruction to use the above replacement items. If the determination result of step S40 is positive, step S41 is executed. Otherwise, i.e. if the determination result of step S40 is negative, step S41 is skipped and step S42 is executed.

In step S41, the processor 81 newly sets a candidate game object to replace a candidate game object shown in the opponent selection screen according to a replacement item activated by the user. Specifically, the processor 81 chooses a replacing sub-character using the method described in the above section "(Replacement in response to use of item)." Thereafter, the processor 81 updates the contents of the candidate game object data stored in the storage medium so as to incorporate thereinto the chosen sub-character instead of the sub-character before replacement. Following step S41, step S42 is executed.

In step S42, the processor 81 updates the display of the opponent selection screen. Specifically, the processor 81 generates the opponent selection screen based on the contents changed by steps S37, S39, and S41, and causes the display device to display the opponent selection screen. Following step S42, step S43 is executed.

In step S43, the processor 81 determines whether or not a selected game object has been selected by the user. Specifically, the processor 81 determines whether or not the user has performed an input for specifying a sub-character in the opponent selection screen. If the determination result of step S43 is positive, step S44 is executed. Otherwise, i.e. if the determination result of step S43 is negative, step S37 is executed again. Thereafter, a loop of the series of processes of steps S37-S43 is repeatedly executed until the determination result of step S43 is positive. Note that the loop of the series of processes of steps S37-S43 is executed at a rate of once per predetermined period of time (e.g., a 1-frame time).

In step S44, the processor 81 sets the sub-character selected by the user as a selected game object. In the series of processes of steps S12-S21 executed thereafter, the selected game object set in step S44 is used as an opponent sub-character. Therefore, even if the remaining time of the selected game object has expired during the series of processes of steps S12-S21, the sub-character that is the selected game object is not replaced by another sub-character during that series of processes. Note that in this situation, next time the opponent selection screen is displayed, replacement will be performed by step S36. After step S44, the processor 81 ends the opponent selection process of FIG. 21.

[4. Effects and Variations of Exemplary Embodiment]

As described above, in the exemplary embodiment, the game system 1 determines whether or not to give the user a selected game object selected by the user from candidate game objects (steps S16 and S19), and if the game system 1 determines to give, gives the selected game object to the user (step S21). Thus, the amusingness of selecting a game object that the user desires to acquire in the game can be improved, compared to when a game object is simply given to the user.

Here, in the exemplary embodiment, a candidate game object shown to the user is replaced, depending on the remaining time, and when it is assumed that the user desires to select another game object (i.e., a selected game object has been given to the user, or in another exemplary embodiment, a candidate game object has been selected as a selected game object), replacement may be performed. Therefore, according to the exemplary embodiment, the possibility that a game object that the user does not desire to select is shown can be reduced, and therefore, a candidate game object attractive to the user can be shown, resulting in an improvement in the convenience of the user's selection.

Note that in the exemplary embodiment, an example has been described in which a single user operates a possessed character while an opponent character is controlled by the game system 1. Alternatively, the game may be played by any suitable number of users. For example, in another exemplary embodiment, the competitive game may be played by a user operating a possessed character and another user operating an opponent character. Alternatively, for example, a plurality of possessed characters may appear in the competitive game, and a plurality of users may operate their respective possessed characters.

Note that in one exemplary embodiment, a plurality of users may participate in the game in the following at least three modes: an off-line mode; a local communication mode; and an on-line mode. In the off-line mode, a plurality of users use their respective controllers to perform an input to a single game system 1. In the local communication mode and the on-line mode, a plurality of users use their respective game systems 1, and the game systems 1 communicate with each other, to execute the competitive game. More specifically, in the local communication mode, the game systems 1 communicate with each other by the above local communication (i.e., the second communication embodiment). In the on-line mode, the game systems 1 communicate with each other via a network (i.e., the above first communication embodiment).

In the case where a plurality of users play the game, the game system 1 may select a selected game object from candidate game objects according to a single user's instruction or each user's instruction. For example, a selected game object may be selected according to a predetermined representative user, a selected game object may be selected according to an instruction that is given first, or a selected game object may be selected according to instructions given by a plurality of users (e.g., according to majority rule). Note that in the local communication mode and the on-line mode, for example, a lobby for gathering participants may be generated in a game system 1 for a host user, and the host user and each user entering the lobby may play the game. In this case, the host user may be the representative user and may select a selected game object.

In the local communication mode and the on-line mode, a game screen (the opponent selection screen, etc.) is displayed on the display device of each game system. Here, the same or different opponent selection screen may be displayed in the game systems (in other words, the same or different sub-character may be shown in the opponent selection screens of the game systems). For example, in the case where the representative user is set, the same screen as an opponent selection screen (e.g., an opponent selection screen similar to that of the exemplary embodiment) in the game system of the representative user may be displayed in the other game systems. Alternatively, in each game system, the opponent selection screen for allowing the user of the game system to perform selection may be displayed. In this case, a selected game object may be selected according to an instruction that is given first, or a selected game object may be selected according to majority rule on instructions given by a plurality of users. As described above, the opponent selection screen may contain the same or different contents in a single-player mode (i.e., the exemplary embodiment) and in a multiple-player mode. In other words, the opponent selection screen in the multiple-player mode may be the same as that of the exemplary embodiment. Alternatively, a different opponent selection screen (e.g., the opponent selection screen in the game system of the representative user) may be prepared for the multiple-player mode.

In another exemplary embodiment, for example, after a user selects a sub-character, other users participate in the competitive game, and these multiple users may cooperate with each other to compete with an opponent character.

In the case where multiple users play the game, the additional game may be played by only a representative user, by the multiple users, or by one or more of the multiple users who have won the competitive game. In the case where the additional game is played by only a representative user, when the representative user has won the additional game, a game object is given to all users, or a game object may be given to only the representative user. In the case where some or all of the multiple users play the additional game, a game object may be given to one or more users who have won the additional game. Thus, in the case where multiple users play the game, the giving condition may be determined once for all the multiple users, or alternatively, individually for each of the multiple users.

In the exemplary embodiment, the acquisition game for acquiring a game object, that is played by the user, includes two game: the competitive game and the additional game. In another exemplary embodiment, the acquisition game may be a single type of game. In this case, if the result of the acquisition game does not satisfy a giving condition (e.g., the user loses the game), the game system 1 may replace a selected game object by another game object, or maintain a selected game object as a candidate game object. Furthermore, in the above case where a selected game object is maintained as a candidate game object, the game system 1 may change the condition for the acquisition game such that the giving condition is more easily satisfied, as in the exemplary embodiment.

The exemplary embodiment is applicable as, for example, a game program, a game apparatus, etc., in order to improve amusingness when the user is allowed to select a game object.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium having stored therein an information processing program executable by a processor of an information processing apparatus, wherein
   the information processing apparatus comprises a memory; and
   the information processing program causes the processor to execute:
      choosing a subset of game objects as candidate game objects from among available game objects;
      generating an image of a selection screen showing the candidate game objects, the image being generated for a display;
      managing a remaining time for each of the candidate game objects, the candidate game objects being selectable by a user during the remaining time;
      selecting a candidate game object from among the candidate game objects from the selection screen as a selected game object according to the user's instruction;
      determining whether or not an update condition is satisfied;
      updating, when the update condition is satisfied, possession data in the memory so that the selected game object is set as a possessed game object possessed by the user;
      in response to the remaining time of the candidate game object expiring, replacing the candidate game object on the selection screen with a game object newly chosen from among the available game objects; and
      replacing the selected game object on the selection screen with a game object newly chosen from among the available game objects in response to at least one of a first condition or a second condition being satisfied, the first condition being that the candidate game object has been selected as the selected game object and the second condition being that the update condition is satisfied.

2. The non-transitory computer-readable storage medium according to claim 1, wherein the selected game object is replaced on the selection screen with the game object newly chosen from among the available game objects immediately after the at least one of the first condition or the second condition is satisfied.

3. The non-transitory computer-readable storage medium according to claim 1, wherein
the selected game object is replaced on the selection screen with the game object newly chosen from among the available game objects after a waiting time is expired, the waiting time being set when the at least one of the first condition or the second condition is satisfied, and the waiting time being decreased in accordance with real time.

4. The non-transitory computer-readable storage medium according to claim 1, wherein
the processor chooses the subset of the game objects from among the available game objects based on a randomized algorithm.

5. The non-transitory computer-readable storage medium according to claim 4, wherein
a rarity parameter is set for each of the candidate game objects, and
the processor chooses the subset of the game objects from among the available game objects based on the randomized algorithm and the rarity parameter.

6. The non-transitory computer-readable storage medium according to claim 5, wherein
the remaining time is based in part on the rarity parameter set for the candidate game object.

7. The non-transitory computer-readable storage medium according to claim 1, wherein
the information processing program causes the processor to further execute:
performing an acquisition game played by the user after the candidate game object is selected, and
based on a result of the acquisition game, the processor determines whether or not the update condition is satisfied.

8. The non-transitory computer-readable storage medium according to claim 7, wherein
the processor executes at least a competitive game as the acquisition game, and
the processor determines that the update condition is satisfied on a condition that the user has won in the competitive game.

9. The non-transitory computer-readable storage medium according to claim 8, wherein
the processor executes the competitive game using a character indicated by the selected game object as an opponent-side character.

10. The non-transitory computer-readable storage medium according to claim 8, wherein
the processor executes the competitive game in which a character indicated by or associated with the selected game object is an opponent.

11. The non-transitory computer-readable storage medium according to claim 8, wherein
the information processing program causes the processor to further execute:
generating an image in which an opponent in the competitive game is associated with a character indicated by the selected game object.

12. The non-transitory computer-readable storage medium according to claim 8, wherein
in response to the user losing in the competitive game, the processor replaces the candidate game object on the selection screen with a game object newly chosen from among the available game objects after the user's loss in the competitive game.

13. The non-transitory computer-readable storage medium according to claim 8, wherein
on a condition that the user has won in the competitive game, the processor executes an additional game as a part of the acquisition game in addition to the competitive game, and
based on a result of the additional game, the processor determines whether or not the update condition is satisfied.

14. The non-transitory computer-readable storage medium according to claim 13, wherein
on the condition that the user has won in the competitive game, and a result of the additional game dissatisfies the update condition, the processor maintains the selected game object chosen as the candidate game object as long as the remaining time of the selected game object is unexpired.

15. The non-transitory computer-readable storage medium according to claim 7, wherein
on a condition that the update condition has not been satisfied for the selected game object based on the result of the acquisition game and the same game object is subsequently selected as a selected game object according to the user's instruction, the processor changes the acquisition game so as to facilitate satisfaction of the update condition.

16. The non-transitory computer-readable storage medium according to claim 7, wherein
the processor executes, as the acquisition game, a timing game in which it is determined whether or not the update condition is satisfied, based on timing of the user's input.

17. The non-transitory computer-readable storage medium according to claim 16, wherein
the processor determines whether or not the user wins the timing game based on whether or not the timing of the user's input is in a winning range, the winning range being repeated during the timing game, and
on a condition that the timing game has been won, the processor determines that the update condition is satisfied.

18. The non-transitory computer-readable storage medium according to claim 17, wherein
on a condition that the update condition has not been satisfied for the selected game object based on a result of the timing game and the same game object is subsequently selected as a selected game object according to the user's instruction, the processor increases the winning range.

19. The non-transitory computer-readable storage medium according to claim 1, wherein
the processor decreases the remaining time as time passes, irrespective of whether or not the selection screen is displayed on the display, and
on a condition that the remaining time of the candidate game object has been expired while the selection screen is not displayed, the processor generates a new image of a second selection screen showing a candidate game object newly chosen from among the available game objects, in response to the selection screen is displayed again, the new image being generated for a display.

20. The non-transitory computer-readable storage medium according to claim 1, wherein the processor replaces the candidate game object on the selection screen with a game object newly chosen from among the available game objects, in response to use of an item specified by the user or consumption of a game parameter by the user.

21. The non-transitory computer-readable storage medium according to claim 1, wherein
the image of the selection screen includes the remaining time of the selectable game object.

22. An information processing device comprising one or more processors and a memory, wherein
the one or more processors execute:
choosing a subset of game objects as candidate game objects from among available game objects;
generating an image of a selection screen showing the candidate game objects;
managing a remaining time for each of the candidate game objects, the candidate game objects being selectable by a user during the remaining time;
selecting at least one of the candidate game object from among the candidate game objects from the selection screen as a selected game object according to the user's instruction;
determining whether or not an update condition is satisfied,
updating, when the update condition is satisfied, possession data in the memory so that the selected game object is set as a possessed game object possessed by the user;
in response to the remaining time of the at least one candidate game object expiring, replacing the at least one candidate game object on the selection screen with a game object newly chosen from the available game objects; and
replacing the selected game object on the selection screen with a game object newly chosen from among the available game objects in response to at least one of a first condition or a second condition being satisfied, the first condition being that the at least one candidate game object has been selected as the selected game object and the second condition being that the update condition is satisfied.

23. An information processing system comprising one or more processors and a memory, wherein
the one or more processors execute:
choosing a subset of game objects as candidate game objects from among available game objects;
generating an image of a selection screen showing the candidate game objects, the image being generated for a display;
managing a remaining time for each of the candidate game objects, the candidate game objects being selectable by a user during the remaining time;
selecting a candidate game object from among the candidate game objects from the selection screen as a selected game object according to the user's instruction;
determining whether or not an update condition is satisfied;
updating, when the update condition is satisfied, possession data in the memory so that the selected game object is set as a possessed game object possessed by the user;
in response to the remaining time of the candidate game object being expired, replacing the candidate game object on the selection screen with a game object newly chosen from among the available game objects; and
replacing the selected game object on the selection screen with a game object newly chosen from among the available game objects in response to at least one of a first condition or a second condition being satisfied, the first condition being that the candidate game object has been selected as the selected game object and the second condition being that the update condition is satisfied.

24. An information processing method executable by an information processing system, the method comprising:
choosing a subset of game objects as candidate game objects from among available game objects;
generating an image of a selection screen showing the candidate game objects, the image being generated for a display;
managing a remaining time for each of the candidate game objects, the candidate game objects being selectable by a user during the remaining time;
selecting a candidate game object from among the candidate game objects from the selection screen as a selected game object according to the user's instruction;
determining whether or not an update condition is satisfied;
updating, when the update condition is satisfied, possession data in the memory so that the selected game object is set as a possessed game object possessed by the user;
in response to the remaining time of the candidate game object expiring, replacing the candidate game object on the selection screen with a game object newly chosen from among the available game objects; and
replacing the selected game object on the selection screen with a game object newly chosen from among the available game objects in response to at least one of a first condition or a second condition being satisfied, the first condition being that the candidate game object has been selected as the selected game object and the second condition being that the update condition is satisfied.

* * * * *